(12) United States Patent
Yamagishi

(10) Patent No.: US 9,942,619 B2
(45) Date of Patent: Apr. 10, 2018

(54) CONTENT SUPPLY DEVICE, CONTENT SUPPLY METHOD, PROGRAM, AND CONTENT SUPPLY SYSTEM

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 14/891,023

(22) PCT Filed: May 9, 2014

(86) PCT No.: PCT/JP2014/062488
§ 371 (c)(1),
(2) Date: Nov. 13, 2015

(87) PCT Pub. No.: WO2014/188886
PCT Pub. Date: Nov. 27, 2014

(65) Prior Publication Data
US 2016/0127798 A1 May 5, 2016

(30) Foreign Application Priority Data

May 22, 2013 (JP) ................. 2013-107678

(51) Int. Cl.
*H04N 7/173* (2011.01)
*H04N 21/6437* (2011.01)
(Continued)

(52) U.S. Cl.
CPC ..... *H04N 21/6437* (2013.01); *H04N 21/6332* (2013.01); *H04N 21/6405* (2013.01);
(Continued)

(58) Field of Classification Search
CPC .......... H04N 21/6437; H04N 21/6408; H04N 21/6332; H04N 21/6405; H04N 21/64322; H04N 21/84
(Continued)

(56) References Cited

U.S. PATENT DOCUMENTS

| 2013/0097334 A1 | 4/2013 | Wu et al. |
| 2013/0163430 A1* | 6/2013 | Gell ................. H04N 21/23439 370/235 |
| 2013/0294747 A1* | 11/2013 | Takahashi .......... H04N 21/2187 386/241 |

FOREIGN PATENT DOCUMENTS

CN 103098484 A 5/2013
WO WO 2010/050022 A1 5/2010
(Continued)

OTHER PUBLICATIONS

Extended European Search Report issued in Application No. EP 14800786.7, dated Dec. 8, 2016.
(Continued)

*Primary Examiner* — Nnenna Ekpo
(74) *Attorney, Agent, or Firm* — Oblon, McClelland, Maier & Neustadt, L.L.P.

(57) ABSTRACT

The present disclosure relates to a content supply device, a content supply method, a program, and a content supply system, which are capable of extending the DASH and seamlessly switching reception and reproduction of unicast transmission, multicast transmission, or broadcast transmission. A content supply device includes a HTTP transmitting unit that unicast-transmits a segment file of streaming data according to HTTP, an RTP transmitting unit that stores the segment file in an RTP packet without change, and transmits the RTP packet through at least one of multicasting and broadcasting according to RTP, and a metafile generating unit that generates a metafile in which a temporal corre- (Continued)

spondence relation between the segment file transmitted according to the HTTP and the segment file transmitted according to the RTP is described, and supplies the metafile to a reception side. The present disclosure can be applied to a system that delivers content in a streaming manner.

19 Claims, 19 Drawing Sheets

(51) Int. Cl.
    *H04N 21/6332*     (2011.01)
    *H04N 21/6405*     (2011.01)
    *H04N 21/6408*     (2011.01)
    *H04N 21/643*     (2011.01)
    *H04N 21/84*     (2011.01)
    *H04N 21/845*     (2011.01)
    *H04N 21/854*     (2011.01)

(52) U.S. Cl.
    CPC ... *H04N 21/6408* (2013.01); *H04N 21/64322* (2013.01); *H04N 21/84* (2013.01); *H04N 21/8456* (2013.01); *H04N 21/85406* (2013.01)

(58) Field of Classification Search
    USPC ............. 725/110, 94, 98, 109, 114, 118, 131
    See application file for complete search history.

(56) References Cited

FOREIGN PATENT DOCUMENTS

WO     WO 2012/060581 A2     5/2012
WO     2012/096372 A1     7/2012

OTHER PUBLICATIONS

Schulzrinne, et al., "RTP: A Transport Protocol for Real-Time Applications," Network Working Group, Standards Track, Jul. 2003, 89 pages.
Hirabayashi, "Realizing Moving Image Deiivery with No Drop-outs in an Existing Web Server," Nikkei Electronics, Mar. 19, 2012.
Chinese Office Action dated Dec. 5, 2017, issued in Chinese Patent Application No. 201480028025.0 (with English translation).

* cited by examiner

FIG.8

```
<MPD ...... >
<Period ...... >
<AdaptationSet>
<Representation ...... >
......
<BaseURL>http://example.com/counter-10mn_avc_dash.mp4</BaseURL>
<SegmentList ...... >
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
........
</MPD>
```

FIG.9

```
<MPD ... >
<Period ..., >
<AdaptationSet>
<Representation ..., >
<BaseURL serviceLocationAttributeUrl=" http://example.com/serviceLocationAttributes"
>(ANYTHING DESCRIBED HEREIN IS ASSUMED TO BE IGNORED)</BaseURL>
<SegmentList ..., >
......
<SegmentURL mediaRange="795-83596" rtspRange=" clock=19961108T143720.25Z-19961108T143730.25Z" />
<SegmentURL mediaRange="83597-166046" rtspRange=" clock=19961108T143730.25Z-19961108T143740.25Z" />
......
</MPD>
```

FIG. 10

```
<xs:schema xmlns:xs="http://www.w3.org/2001/XMLSchema"
elementFormDefault="qualified" attributeFormDefault="unqualified">
 <xs:element name="ServiceLocation" type="ServiceLocationType"/>
 <xs:complexType name="ServiceLocationType">
  <xs:sequence>
   <xs:element name="IPMulticastAddress" type="xs:anyURI" maxOccurs="unbounded"/>
   <xs:element name="DeliverySystem" type="DeliverySystemAttributesType" minOccurs="0" maxOccurs="unbounded"/>
  </xs:sequence>
 </xs:complexType>
 <xs:complexType name="DeliverySystemAttributesType">
  <xs:sequence>
   <xs:element name="DeliverySystemIdentifier" type="xs:string" maxOccurs="unbounded"/>
   <xs:element name="DeliverySystemDescriptor" type="xs:string" maxOccurs="unbounded"/>
  </xs:sequence>
 </xs:complexType>
</xs:schema>
```

FIG.12

```
<bundleDescription
xmlns="urn:3GPP:metadata:2005:MBMS:userServiceDescription"
xmlns:xsi="http://www.w3.org/2001/XMLSchema-instance"
xmlns:r8="urn:3GPP:metadata:2008:MBMS:userServiceDescription">
<userServiceDescription serviceId="urn:123">
<deliveryMethod sessionDescriptionURL="http://www.example.com/a.sdp"/>
<r8:Registration>
<r8:registrationURL>http://www.example.com/register.php</r8:registrationURL>
</r8:Registration>
</userServiceDescription>
</bundleDescription>
```

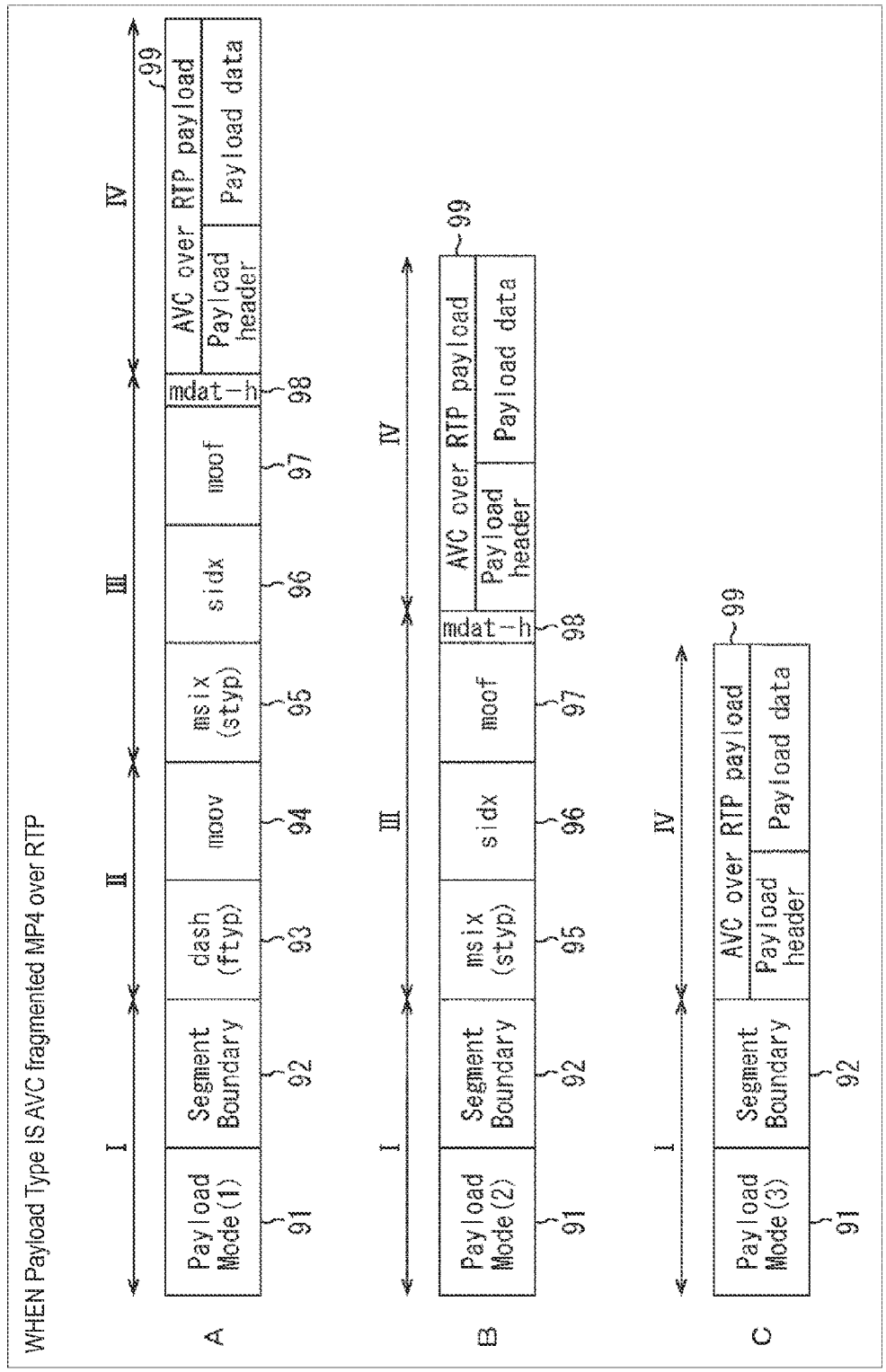

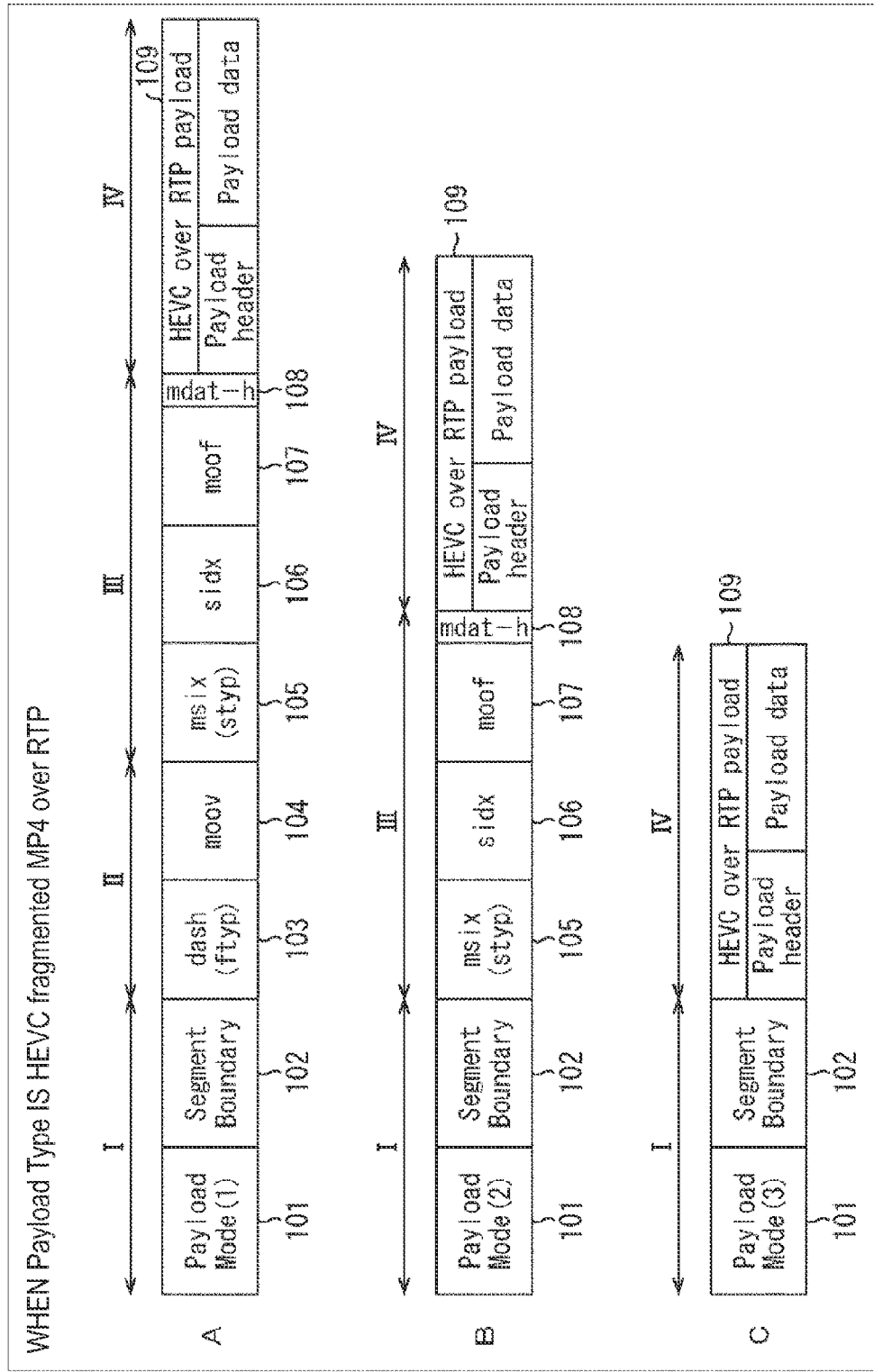

FIG. 17

| | FIRST RTP PACKET | SECOND RTP PACKET | THIRD RTP PACKET | FOURTH RTP PACKET | FIFTH RTP PACKET |
|---|---|---|---|---|---|
| A FIRST COMBINATION PATTERN | PayloadMode(1) Segment Boundary=1 | PayloadMode(1) Segment Boundary=2 | PayloadMode(1) Segment Boundary=3 | PayloadMode(1) Segment Boundary=1 | PayloadMode(1) Segment Boundary=3 |
| B SECOND COMBINATION PATTERN | PayloadMode(1) Segment Boundary=1 | PayloadMode(2) Segment Boundary=2 | PayloadMode(2) Segment Boundary=3 | PayloadMode(1) Segment Boundary=1 | PayloadMode(2) Segment Boundary=3 |
| C THIRD COMBINATION PATTERN | PayloadMode(1) Segment Boundary=1 | PayloadMode(2) Segment Boundary=2 | PayloadMode(3) Segment Boundary=3 | PayloadMode(1) Segment Boundary=1 | PayloadMode(3) Segment Boundary=3 |
| D FOURTH COMBINATION PATTERN | PayloadMode(1) Segment Boundary=1 | PayloadMode(3) Segment Boundary=2 | PayloadMode(3) Segment Boundary=2 | PayloadMode(3) Segment Boundary=2 | PayloadMode(3) Segment Boundary=3 |

CONTENT SUPPLY DEVICE, CONTENT SUPPLY METHOD, PROGRAM, AND CONTENT SUPPLY SYSTEM

TECHNICAL FIELD

The present disclosure relates to a content supply device, a content supply method, a program, and a content supply system, and more particularly, to a content supply device, a content supply method, a program, and a content supply system, which are capable of multicast-transmitting or broadcast-transmitting content via a broadcasting network by the Real-time Transport Protocol (RTP) as an alternative path when content is unicast-transmitted via the Internet by the hypertext transfer protocol (HTTP).

BACKGROUND ART

In recent years, over the top video (OTT-V) has become a mainstream of a streaming service via the Internet, and as a fundamental technology thereof, Moving Picture Experts Group-Dynamic Adaptive Streaming over HTTP (hereinafter, referred to as "DASH") (MPEG-DASH) using a HTTP in which a supply side is connected with a reception side in a point to point manner, similarly to browsing of a web site or the like has been known (for example, see Non-Patent Literature 1).

In the DASH, an adaptive streaming technique is implemented. In other words, a content supply side has a system capable of supplying a plurality of streams that include content of the same subject but differ in an image quality or an angle of view size, and a reception side is configured to switch and view an optimal stream according to according to a communication environment of the Internet or a capability or a state of the reception side.

In the DASH, as information enabling the reception side to adaptively switch a stream, a metafile called a media presentation description (MPD) is supplied from the supply side to the reception side. An address (url information) indicating a server of a supply source of streaming data (media data such as audio/video/subtitle) divided into chunks is described in the MPD.

The reception side can access the server based on the url information and acquire and reproduce HTTP-transmitted streaming data.

FIG. 1 illustrates an example of a configuration of a content supply system that delivers content in a streaming manner based on the DASH.

A content supply system 20 includes a content management server 21, a DASH segment streamer 22, and a DASH MPD server 23 which are arranged at a side at which content is supplied and a DASH client 30 arranged at a side at which content is received and viewed. Although not illustrated, there are assumed to be a plurality of DASH clients 30.

The content management server 21 manages content supplied to the reception side, generates a plurality of pieces of streaming data having different bit rates from content of the same subject, and outputs the generated streaming data to the DASH segment streamer 22.

The DASH segment streamer 22 temporally divides streaming data of content into segments, holds each of the segments as a file, and notifies the DASH MPD server 23 of an address of the files. Further, the DASH segment streamer 22 unicast-delivers the file of the segmented streaming data in response to a request from the DASH client 30 of the reception side via the Internet 11 as an HTTP server.

The DASH MPD server 23 generates an MPD in which, for example, an address of the DASH segment streamer 22 serving as the supply source of the files of the segmented streaming data is described. The DASH MPD server 23 unicast-transmits the MPD to the DASH client 30 via the Internet 11 in response to the request from the DASH client 30 of the reception side as the HTTP server.

The DASH client 30 of the reception side receives and reproduces content, and accesses the DASH segment streamer 22 serving as the HTTP server based on the MPD acquired from the DASH MPD server 23 and receives and reproduces the files of the segmented streaming data.

There are cases in which a cache server is installed on the Internet 11 to cache the unicast-transmitted MPD, the files of the segmented streaming data, or the like and undertake an operation of the DASH segment streamer 22 or the DASH MPD server 23.

CITATION LIST

Non-Patent Literature

Non-Patent Literature 1: Mitsuhiro Hirabayashi, "Achieving Uninterrupted Video Streaming Using Existing Web Servers," NIKKEI ELECTRONICS, Mar. 19, 2012

SUMMARY OF INVENTION

Technical Problem

As described above, in the DASH, an adaptive streaming technique of supplying content by unicast-transmission according to the HTTP is implemented.

For example, when content that is likely to be simultaneously acquired and reproduced by a number of DASH clients 30, like content of a real-time sports broadcast, is simultaneously supplied to a number of devices through the DASH, since the HTTP is used, support by a contents delivery network (CDN) is necessary. However, although it is supported by the CDN, it is difficult to obtain scalability as high as in existing broadcast-delivery due to a cost restriction.

By the way, in order to supply content to a number of reception sides simultaneously, there is a method of using a multicast bearer or a broadcast bearer via a television broadcasting network or a mobile network, and in this method, the RTP is commonly used.

Thus, when the reception side can receive and reproduce the multicast-transmitted or broadcast-transmitted content, it is desirable that the reception side can select a stream adaptively using the multicast transmission or the broadcast transmission as an alternative path in the DASH.

However, in the current specification of the DASH, only unicast delivery of streaming data of content according to the HTTP is considered, and the use of the multicast bearer or the broadcast bearer is not considered.

Thus, in the MPD of the DASH, it is difficult to describe a correspondence relation between a DASH segment unicast-transmitted according to the HTTP and a content interval streamed according to the RTP on the multicast bearer or the broadcast bearer corresponding to the segment interval.

Further, currently, a payload format that can be stored in the RTP packet without change and without destroying the box structure of the fragmented MP4 that is a content stream chunk serving as a control target of the DASH is not specified.

Thus, in the current standard of the DASH, it is difficult to implement seamless switching of content between unicast delivery and either of multicast transmission and broadcast transmission.

The present disclosure was made in light of the foregoing, and it is desirable to implement seamless switching of content between the unicast transmission according to the HTTP and either of the multicast transmission and the broadcast transmission according to the RTP.

Solution to Problem

According to a first aspect of the present disclosure, there is provided a content supply device that supplies streaming data of content according to MPEG-DASH, the content supply device including: a HTTP transmitting unit configured to convert the streaming data into files in units of segments and unicast-transmit the resulting segment files according to HTTP; an RTP transmitting unit configured to store the segment file in an RTP packet without change and transmit the RTP packet through at least one of multicasting and broadcasting according to RTP; and a metafile generating unit configured to generate a metafile in which a temporal correspondence relation between the segment file unicast-transmitted according to the HTTP and the segment file transmitted through the at least one of the multicasting and the broadcasting according to the RTP is described and supply the metafile to a reception side.

The streaming data of the content can be a fragmented MP4. The RTP transmitting unit can store the segment file in the RTP packet while maintaining a box structure of the fragmented MP4, and transmit the RTP packet through the at least one of the multicasting and the broadcasting according to the RTP.

The RTP transmitting unit can describe a transmission time of a first bit at a time of transmission of the RTP packet in a time stamp field of an RTP header of the RTP packet.

The RTP transmitting unit can describe information indicating a mode of an RTP payload and information indicating a segment boundary in the RTP payload of the RTP packet, and arrange an NAL unit in payload data.

The RTP transmitting unit can arrange both metadata of an Initialization Segment and metadata of a Media Segment specified in the MPEG-DASH in an RTP payload of the RTP packet, arrange the metadata of the Media Segment in the RTP payload of the RTP packet, or arrange neither of the metadata of the Initialization Segment and the metadata of the Media Segment in the RTP payload of the RTP packet.

According to the first aspect of the present disclosure, there is provided a content supply method of a content supply device that supplies streaming data of content according to MPEG-DASH, the content supply method including: a HTTP transmission step of converting the streaming data into files in units of segments and unicast-transmitting the resulting segment files according to HTTP through the content supply device; an RTP transmission step of storing the segment file in an RTP packet without change and transmitting the RTP packet through at least one of multicasting and broadcasting according to RTP through the content supply device; and a metafile generation step of generating a metafile in which a temporal correspondence relation between the segment file unicast-transmitted according to the HTTP and the segment file transmitted through the at least one of the multicasting and the broadcasting according to the RTP is described and supplying the metafile to a reception side through the content supply device.

According to the first aspect of the present disclosure, there is provided a program causing a computer that supplies streaming data of content according to MPEG-DASH to function as: a HTTP transmitting unit configured to convert the streaming data into files in units of segments and unicast-transmit the resulting segment files according to HTTP; an RTP transmitting unit configured to store the segment file in an RTP packet without change and transmit the RTP packet through at least one of multicasting and broadcasting according to RTP; and a metafile generating unit configured to generate a metafile in which a temporal correspondence relation between the segment file unicast-transmitted according to the HTTP and the segment file transmitted through the at least one of the multicasting and the broadcasting according to the RTP is described and supply the metafile to a reception side.

In the first aspect of the present disclosure, streaming data is converted into files in units of segments, and the resulting segment files are unicast-transmitted according to HTTP. The segment file is stored in an RTP packet without change, and the RTP packet is transmitted through at least one of multicasting and broadcasting according to RTP. A metafile in which a temporal correspondence relation between the segment file unicast-transmitted according to the HTTP and the segment file transmitted through the at least one of the multicasting and the broadcasting according to the RTP is described is generated and supplied to a reception side.

According to a second aspect of the present disclosure, there is provided a content supply system including: a content supply device configured to supply streaming data of content according to MPEG-DASH; and a client device configured to receive the stream data. The content supply device includes a HTTP transmitting unit configured to convert the streaming data into files in units of segments and unicast-transmit the resulting segment files according to HTTP, an RTP transmitting unit configured to store the segment file in an RTP packet without change and transmit the RTP packet through at least one of multicasting and broadcasting according to RTP, and a metafile generating unit configured to generate a metafile in which a temporal correspondence relation between the segment file unicast-transmitted according to the HTTP and the segment file transmitted through the at least one of the multicasting and the broadcasting according to the RTP is described and supply the metafile to a reception side. The client device performs switching between the segment file unicast-transmitted according to the HTTP and the segment file transmitted through the at least one of the multicasting and the broadcasting according to the RTP based on the acquired metafile, and receives and reproduces the segment file.

Advantageous Effects of Invention

According to the first and second aspects of the present disclosure, it is possible to implement seamless switching of content between the unicast transmission according to the HTTP and either of the multicast transmission and the broadcast transmission according to the RTP.

BRIEF DESCRIPTION OF DRAWINGS

FIG. 8 is a diagram illustrating an example of an MPD.

FIG. 9 is a diagram illustrating an example of a modified MPD.

FIG. 10 is a diagram illustrating an example of an XML Schema of a ServiceLocation element.

FIG. 12 is a diagram illustrating an example of a User Service Description.

FIG. 15 is a diagram when an AVC fragmented MP4 is stored in an RTP packet.

FIG. 16 is a diagram when an HEVC segmented MP4 is stored in an RTP packet.

FIG. 17 is a diagram illustrating an example of a combination pattern of a format of an RTP payload.

DESCRIPTION OF EMBODIMENTS

Hereinafter, preferred modes (hereinafter, referred to as "embodiments") for carrying out the present disclosure will be described in detail with reference to the appended drawings.

[Exemplary Configuration of Content Supply System]

A content supply system according to an embodiment of the present disclosure can perform seamless switching between a content stream of the unicast transmission according to the HTTP and a content stream of either of the multicast transmission according to the RTP and the broadcast transmission according to the RTP when a side of receiving and reproducing content receives content.

Specifically, the MPD in the DASH is extended to describe a correspondence relation between a mediaRange indicating an interval of a content stream unicast-delivered according to the HTTP and an rtspRange indicating an interval of a content stream multicast-transmitted or broadcast-transmitted according to the RTP.

A payload format is specified to be stored in an RTP packet more easily without change, that is, without destroying the box structure of the fragmented MP4 that is the content stream chunk serving as the control target of the DASH.

Figure 1:
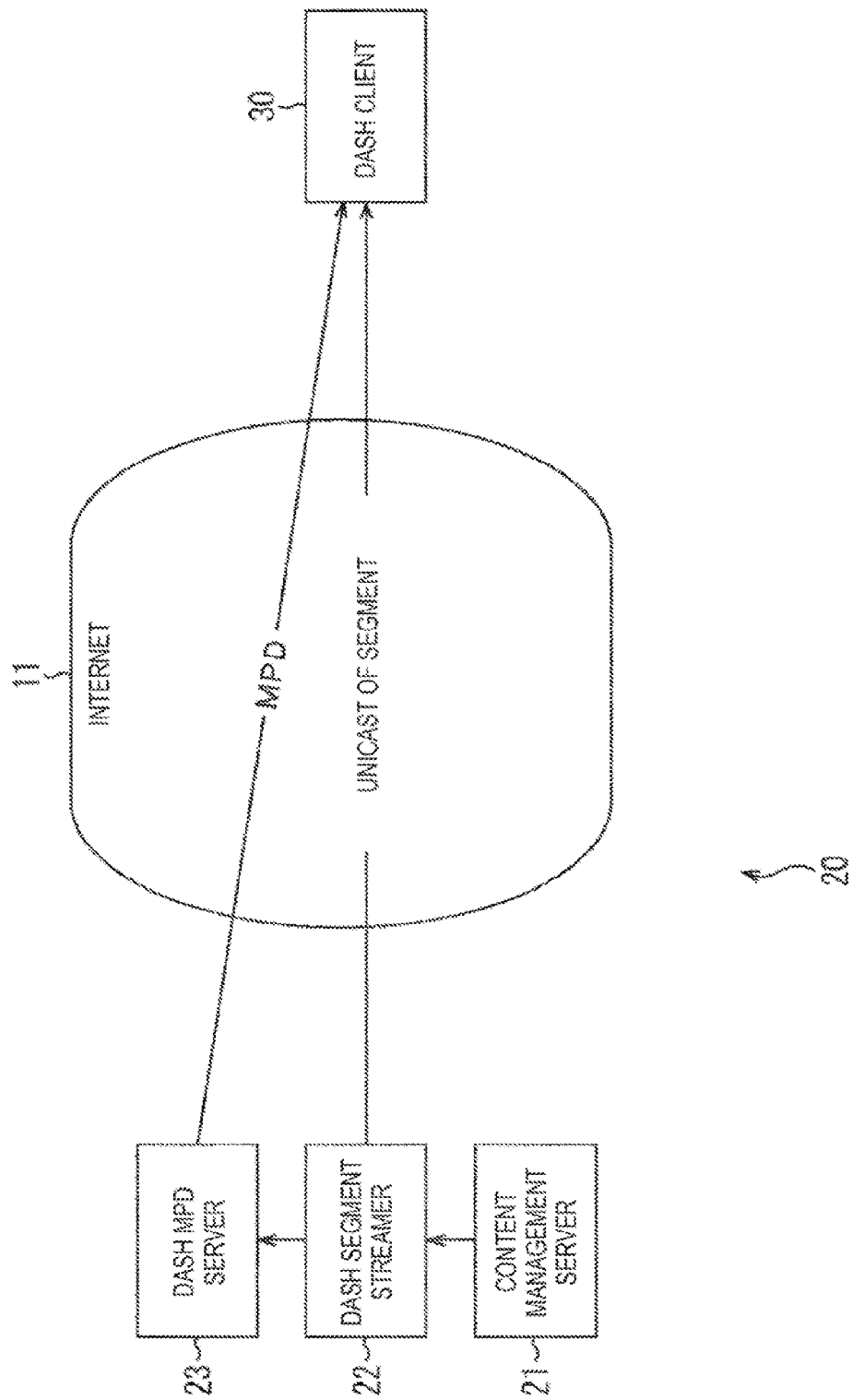
FIG. 1 is a block diagram illustrating an example of a configuration of a content supply system of the related art employing a DASH.
Figure 2:
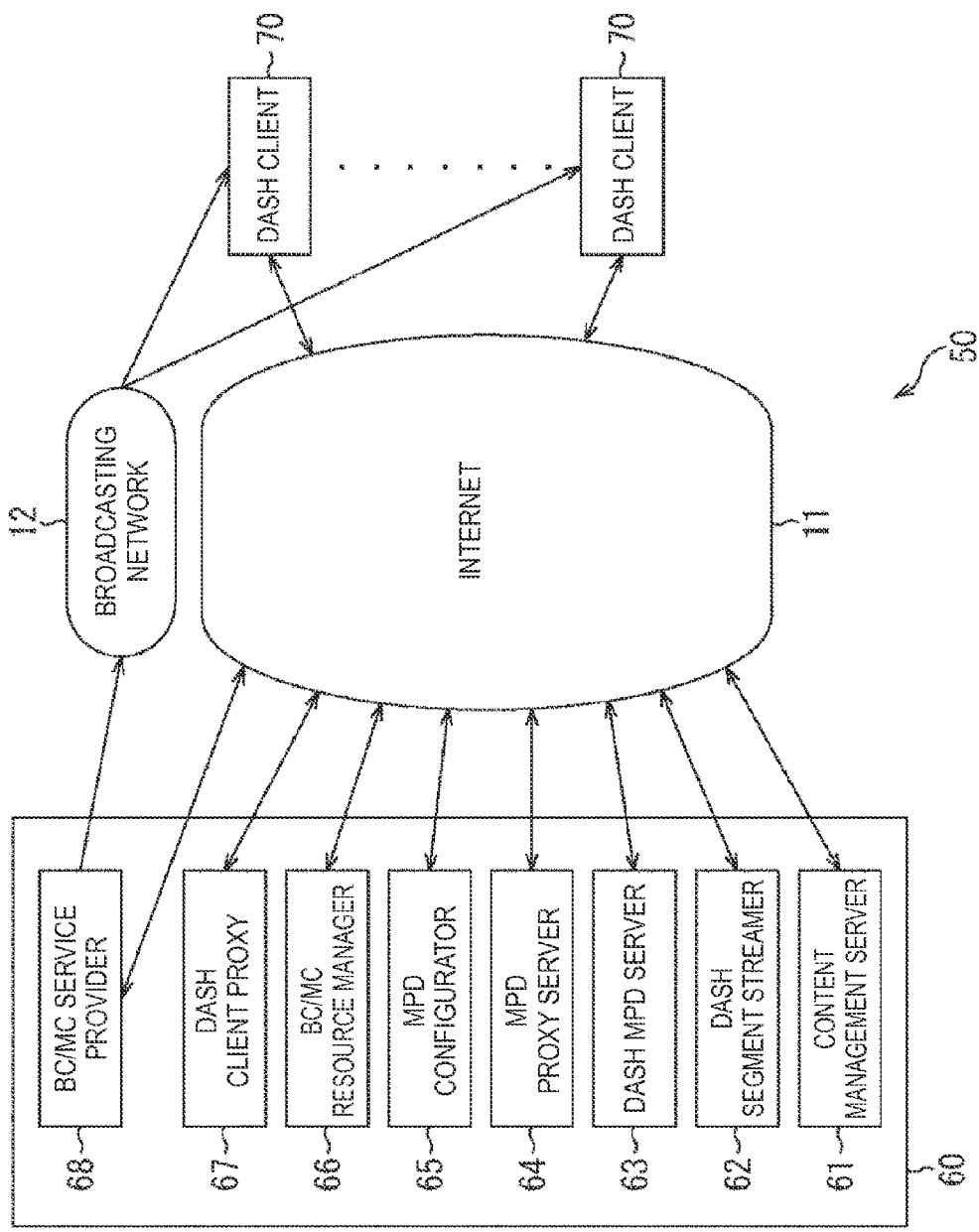
FIG. 2 is a block diagram illustrating an exemplary configuration of a content supply system to which the present disclosure is applied.

FIG. 2 illustrates an exemplary configuration of a content supply system according to an embodiment of the present disclosure.

A content supply system 50 includes a content supply device 60 at a side at which content is supplied and a plurality of DASH clients 70 at a side at which content is received and viewed.

The DASH client 70 can be connected to the content supply device 60 via the Internet 11 and receive content that is unicast-transmitted according to the HTTP. The DASH client 70 can receive content that is multicast-transmitted and broadcast-transmitted from the content supply device 60 via a broadcasting network 12.

Here, the broadcasting network 12 is assumed to include a mobile network such as a Multimedia Broadcast and Multicast Service (MBMS) as well as a television broadcasting network using a ground wave, a satellite wave, or the like.

The content supply device 60 includes a content management server 61, a DASH segment streamer 62, a DASH MPD server 63, an MPD proxy server 64, an MPD configurator 65, a broadcast/multicast (BC/MC) resource manager 66, a DASH client proxy 67, and a broadcast/multicast (BC/MC) service provider 68, which are connected to one another via the Internet 11.

The content management server 61 manages content (including live broadcasting content) to be supplied to the DASH client 70, generates a plurality of pieces of streaming data having different bit rates from content of the same subject, and supplies the plurality of pieces of streaming data having different bit rates to the DASH segment streamer 62.

The DASH segment streamer 62 temporally divides the streaming data of content.

Figure 3:
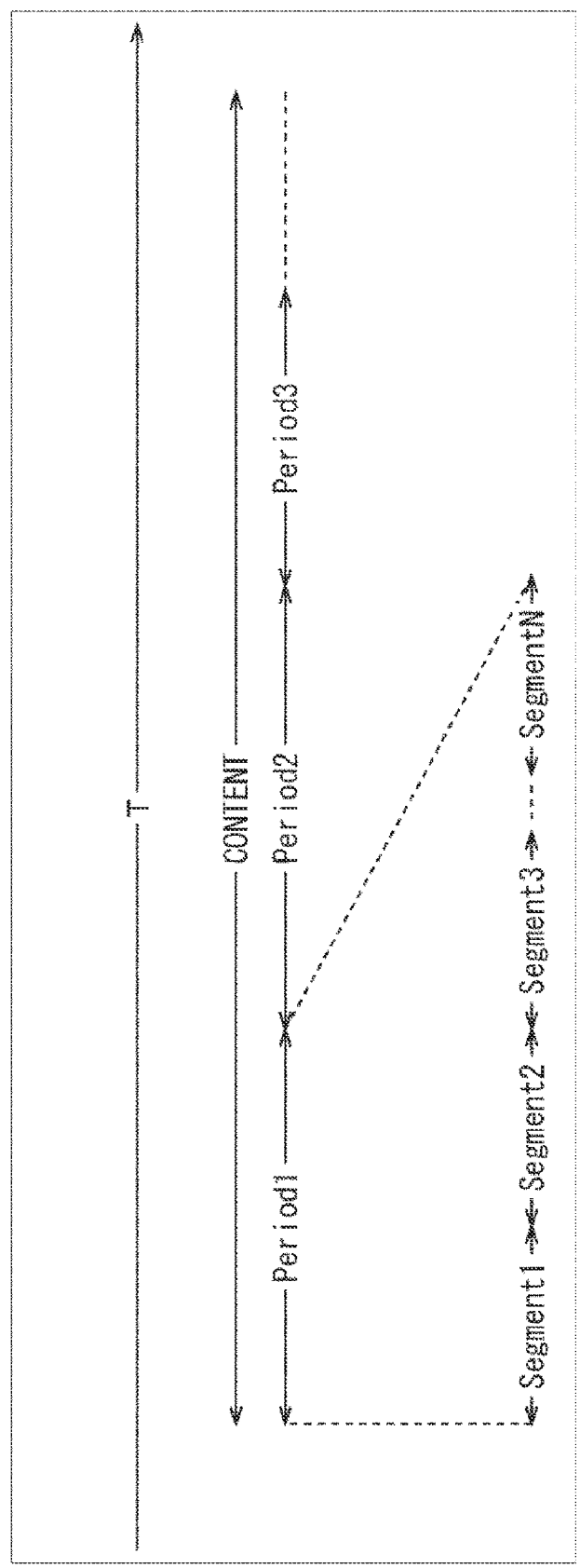
FIG. 3 is a diagram for describing temporal delimiting of content.

FIG. 3 illustrates temporal delimiting of content. In other words, the DASH segment streamer 62 temporally delimits the streaming data of content into periods, divides each period into segments, and holds each segment as a file as illustrated in FIG. 3, and notifies the DASH MPD server 63 of an address of a supply source of the files.

The DASH segment streamer 62 HTTP-transmits (unicast-transmits using the HTTP) the files of the segmented streaming data via the Internet 11 in response to a request from the DASH client 70 as the HTTP server.

The DASH MPD server 63 generates an MPD that is referenced when the DASH client 70 acquires content unicast-transmitted according to the HTTP, and HTTP-transmits the MPD via the Internet 11 in response to a request from the DASH client 70. The DASH MPD server 63 supplies the generated MPD in response to a request from the DASH proxy server 64.

The MPD proxy server 64 acquires the MPD from the DASH MPD server 63, and supplies the MPD to the MPD configurator 65.

The MPD configurator 65 modifies the MPD so that the DASH client 70 can acquire broadcast-transmitted and multicast-transmitted content of the same subject as content unicast-transmitted according to the HTTP.

The broadcast/multicast resource manager 66 notifies the MPD configurator 65 of resource states of the broadcast bearer and the multicast bearer.

The DASH client proxy 67 transmits the modified MPD to the DASH client 70. The DASH client proxy 67 supplies the modified MPD to the broadcast/multicast service provider 68, and multicast-transmits the modified MPD according to the FLUTE.

The DASH client proxy 67 acquires a segment of content unicast-transmitted from the DASH segment streamer 62, stores the acquired segment in the payload of the RTP packet without change and without destroying the box structure, supplies the resultant RTP packet to the broadcast/multicast service provider 68, and multicast-transmits and broadcast-transmits the RTP packet according to the RTP via the broadcasting network 12.

The broadcast/multicast service provider 68 multicast-transmits the modified MPD according to the FLUTE via the broadcasting network 12. The broadcast/multicast service provider 68 multicast-transmits and broadcast-transmits the RTP packet in which the segment of content is stored without change via the broadcasting network 12.

[Overview of MPD]

Next, an overview of the MPD in the DASH will be described with reference to FIGS. 4 and 5.

Figure 4:
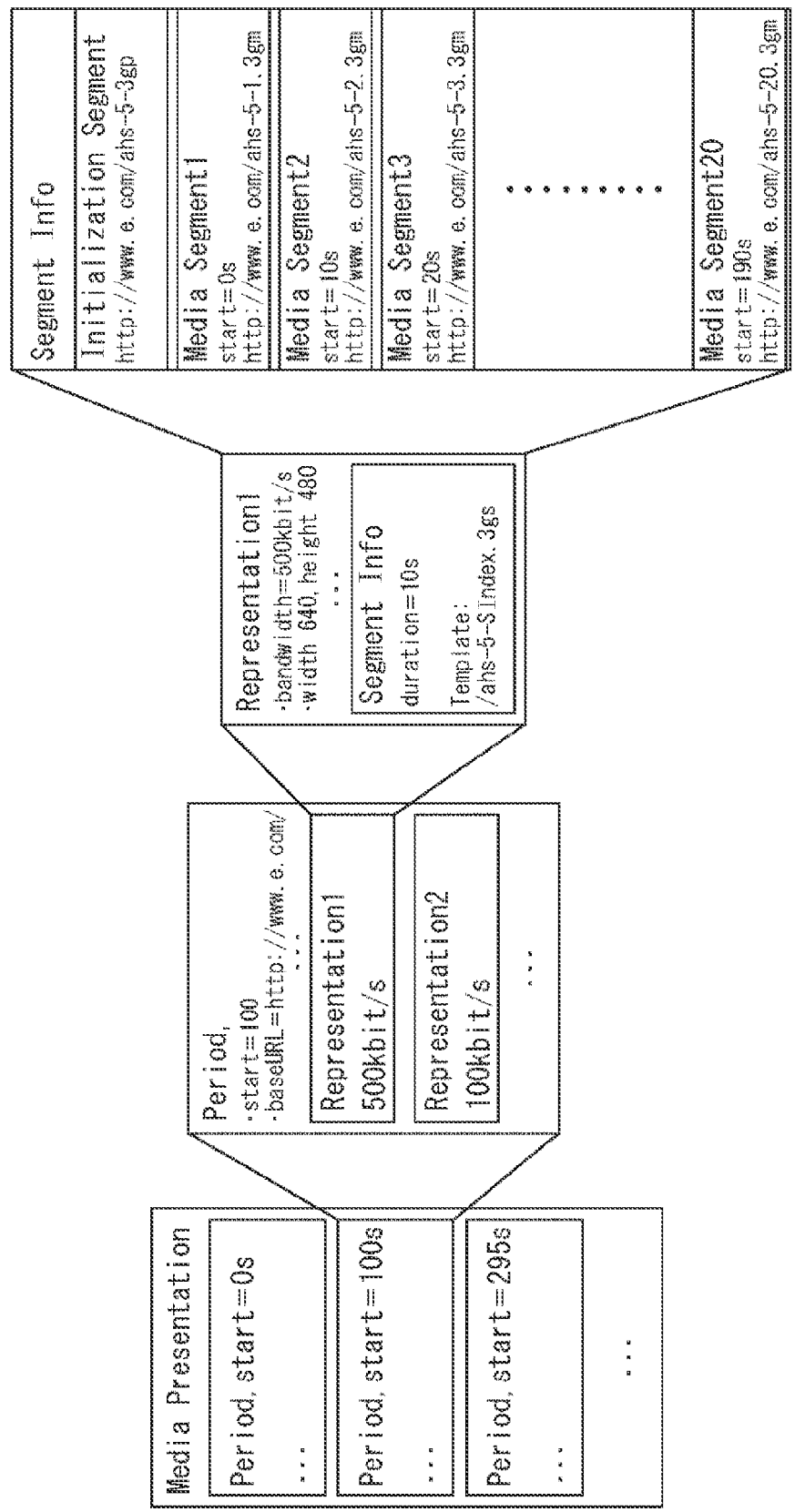
FIG. 4 is a diagram illustrating a configuration of an MPD.
Figure 5:
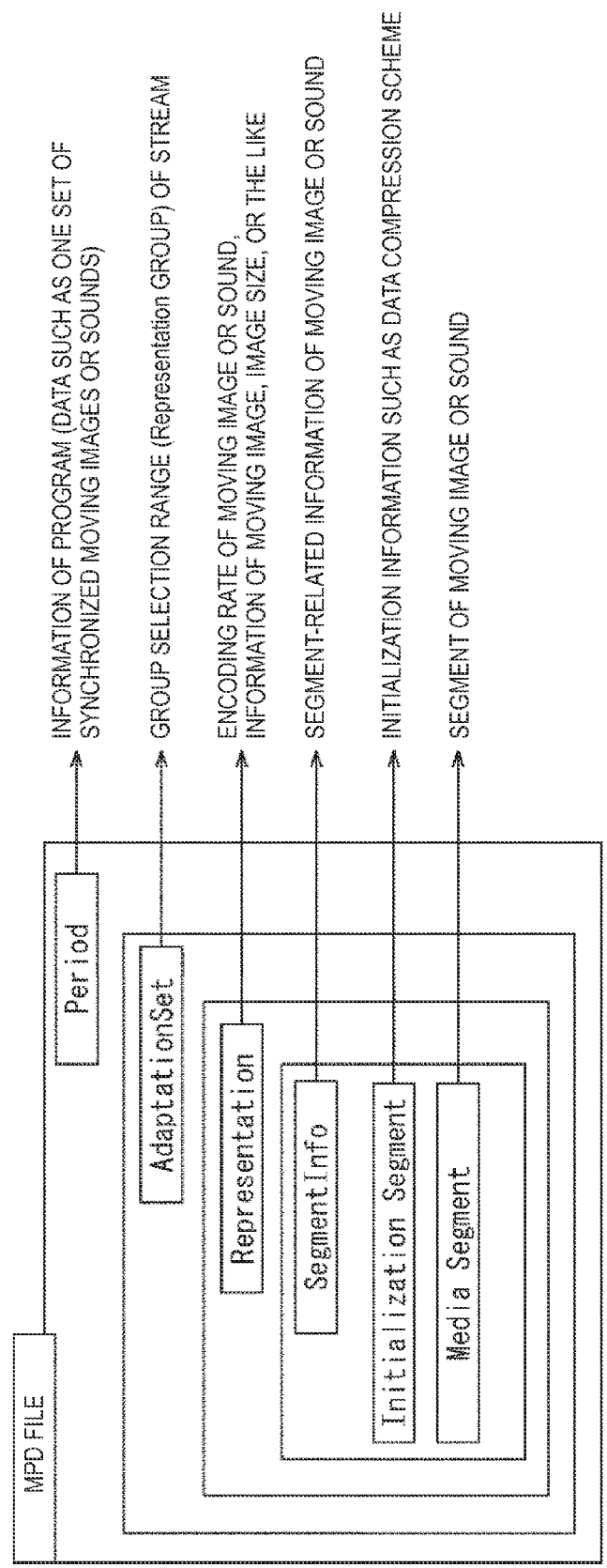
FIG. 5 is a diagram illustrating a hierarchical structure below a period in an MPD.

FIG. 4 illustrates a data configuration of the MPD. FIG. 5 illustrates a hierarchical structure below a period in the MPD.

In the MPD, information related to content (Media) is divided in units of periods, and in each period, a plurality of representations including information related to streaming data of the same subject that differs in a stream attribute such as a bit rate are prepared. The representation stores information related to a segment obtained by further temporally dividing a period.

Figure 6:
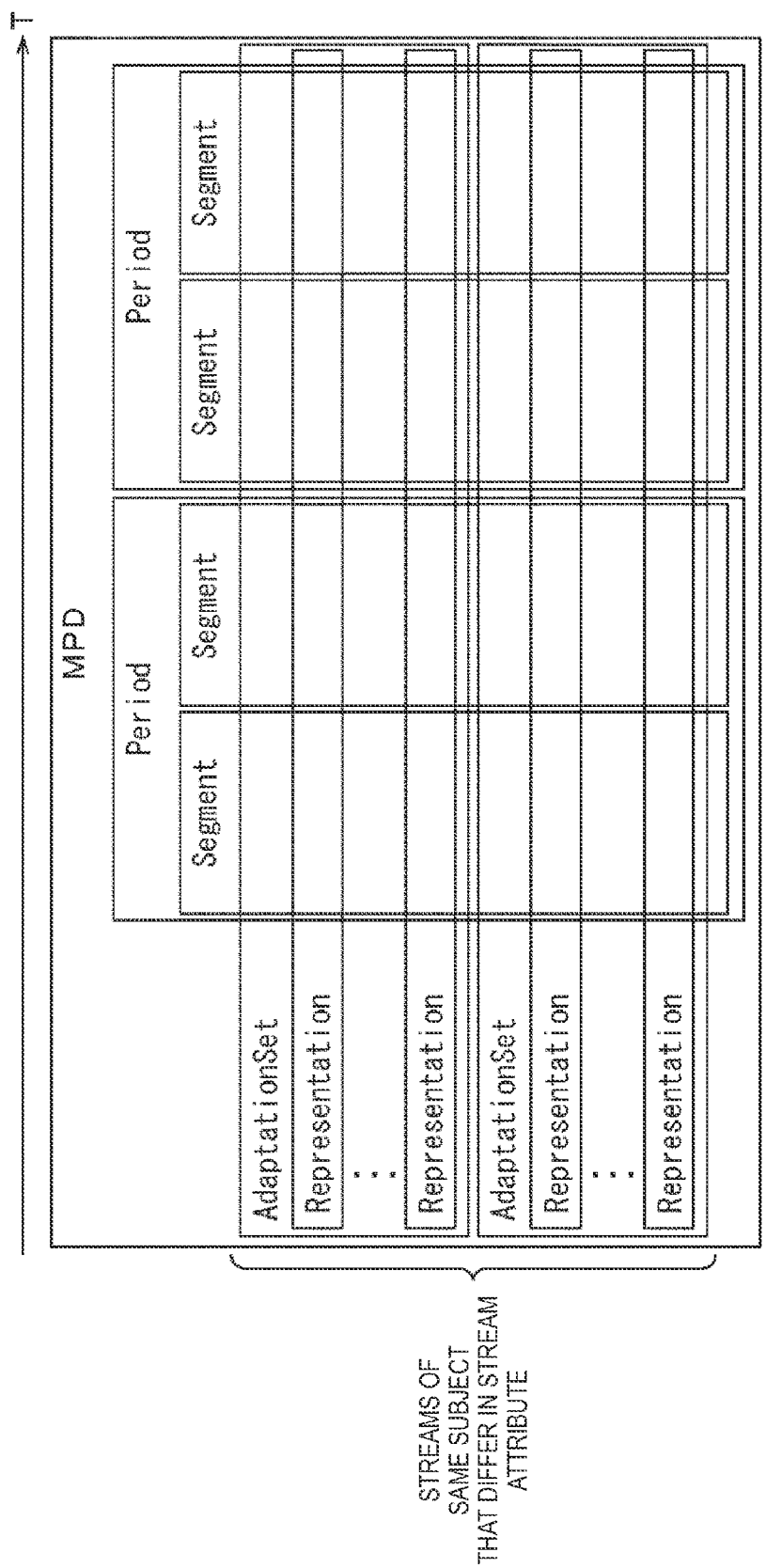
FIG. 6 is a diagram illustrating a state in which a configuration of an MPD is arranged on a time axis.

FIG. 6 illustrates a state in which a structure of the MPD is arranged on a time axis.

As can be understood from FIG. 6, there are a plurality of representations for the same segment of content. Thus, the DASH client 70 can adaptively select any of the representations, perform switching to appropriate stream data according to a communication environment, a decoding capability of the DASH client 70, or the like, and acquire and reproduce the appropriate stream data.

Figure 7:
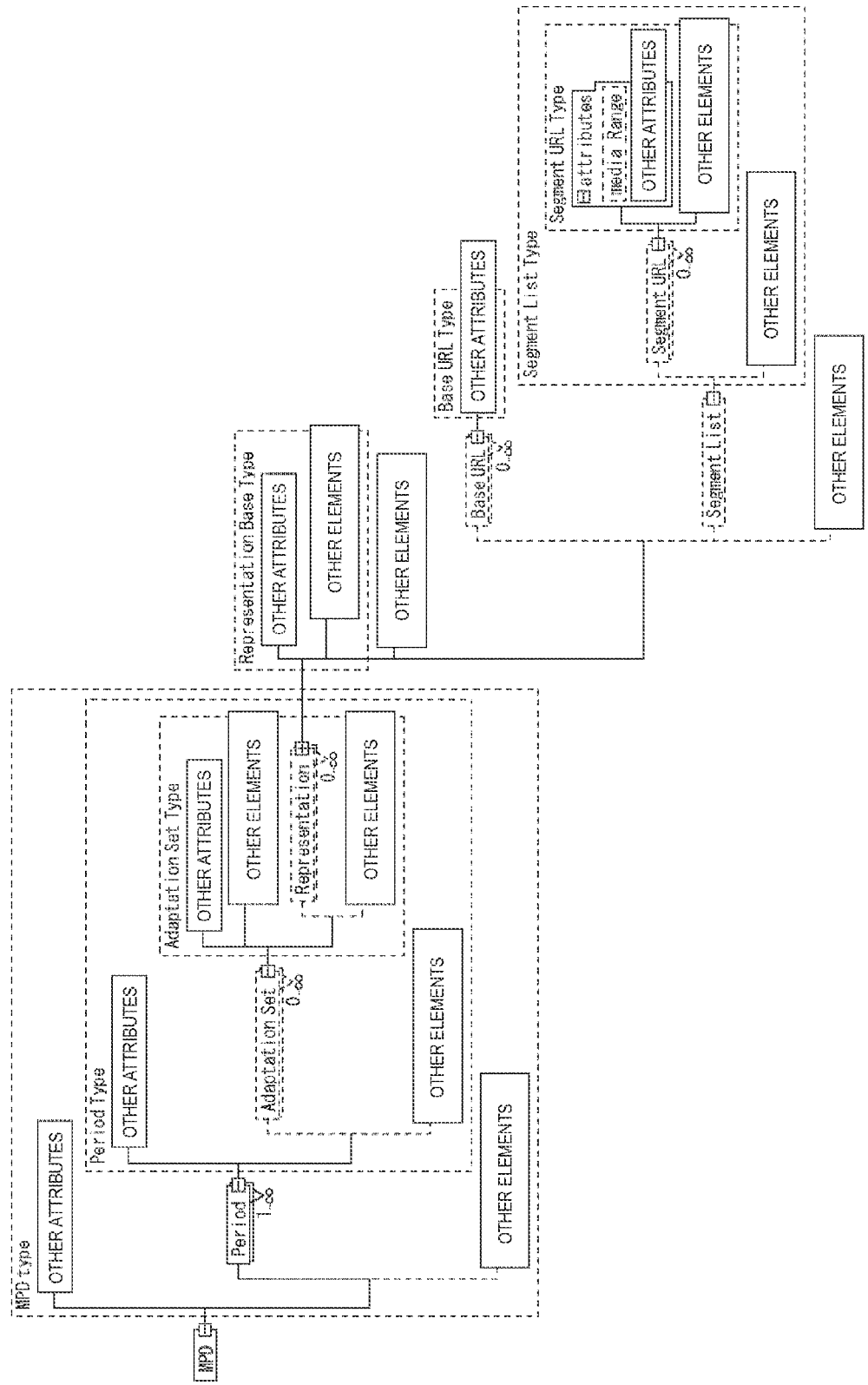
FIG. 7 is a diagram illustrating a detailed structure below a representation of an MPD.

FIG. 7 illustrates a structure below the representation of the MPD.

An address of the DASH segment streamer 62 serving as the supply source of the file storing the segment of content is described in the representation. Specifically, when a plurality of segments are individually held as files, a sequence of addresses (url information) of the respective files is described. Further, when a plurality of segments are collectively held as one file, in addition to an address (Base URL) of the file, a sequence of ranges (mediaRange) of segments in the file is described. FIG. 7 illustrates the latter case.

FIG. 8 illustrates an example in which the structure below the representation illustrated in FIG. 7 is described in an XML format.

The address of the supply source of the file when a plurality of segments of content are stored one file is described in MPD/Period/AdaptationSet/Representation/BaseURL. In the case of FIG. 8, "http://example.com/counter-10mn_avc_dash.mp4" indicates the address of the file.

A sequence of byte ranges of the segments in the file is described in MPD/Period/AdaptationSet/Representation/SegmentList/SegmentURL/@mediaRange.

Thus, the DASH client 70 can acquire a desired segment by designating "http://example.com/counter-10mn_avc_dash.mp4" as a url of the file, designating the mediaRange to the range header, and issuing the HTTP request.

For example, MPD/Period/AdaptationSet/Representation/SegmentList/SegmentURL/@mediaRange="795-83596" indicates that a byte range of a 795-th byte to an 83596-th byte in the file is a first segment. Similarly, next MPD/Period/AdaptationSet/Representation/SegmentList/SegmentURL/@mediaRange="83597-166046" indicates that a byte range of an 83597-th byte to an 166046-th byte in the file is a second segment.

Thus, in order to acquire the first segment, it is desirable to designate a url "http://example.com/counter-10mn_avc_dash.mp4" of the file and describe the mediaRange "795-83596" as a range designation in the HTTP request. At this time, the HTTP request is as follows:

GET/counter-10mn_avc_dash.mp4 HTTP/1.1
Host: example.com
Range: bytes=795-83596

Similarly, in order to acquire the second segment, it is desirable to issue the following HTTP request.

GET/counter-10mn_avc_dash.mp4 HTTP/1.1
Host: example.com
Range: bytes=83597-166046

[Modification of MPD]

In the present embodiment, segmented stream data of content is supplied to the DASH client 70 of the reception side through the unicast transmission according to the HTTP, the multicast transmission according to the RTP, and the broadcast transmission according to the RTP. Further, the DASH client 70 receives and reproduces the segmented stream data of content through seamless switching.

To this end, a ServiceLocation element is newly introduced into the MPD. An rtspRange that corresponds to a byte range of a segment unicast-delivered according to the HTTP and indicates an interval of a stream segment multicast-transmitted and broadcast-transmitted according to the RTP is added.

FIG. 9 illustrates an example in which the MPD illustrated in FIG. 8 is modified.

Specifically, an rtspRange attribute is arranged in a SegmentURL element as an attribute specifying an interval of a segment stream that serves as a switching target of a segment unicast-transmitted according to the HTTP and is multicast-transmitted and broadcast-transmitted according to the RTP. A ServiceLocationAttributeUrl attribute in which a url of a ServiceLocationAttribute file storing a ServiceLocation element as a root element is described is arranged in the BaseURL of the MPD.

A character string of a format (a UTC format) of a range parameter identifying an RTP stream interval defined in a Real Time Streaming Protocol (RTSP) used for control of RTP streaming specified in request for comment (RFC) 2326 is stored in the rtspRange attribute of the SegmentURL element of the modified MPD. The format of the information stored in the rtspRange attribute is not limited to the UTC format.

For example, in the case of FIG. 9, it is illustrated that an interval of 19961108T143720.25Z to 19961108T143730.25Z of a segment stream multicast-transmitted and broadcast-transmitted according to the RTP corresponds to a first segment including data of a byte range of a 795-th byte to an 83596-th byte of a file unicast-transmitted according to the HTTP.

Similarly, it is illustrated that an interval of 19961108T143730.25Z to 19961108T143740.25Z of a segment stream multicast-transmitted and broadcast-transmitted according to the RTP corresponds to a second segment including data of a byte range of an 83597-th byte to an 166046-th byte of a file unicast-transmitted according to the HTTP.

FIG. 10 illustrates an example of an XML schema of the ServiceLocationAttribute file designated by the serviceLocationAttributeUrl attribute.

Figure 11:
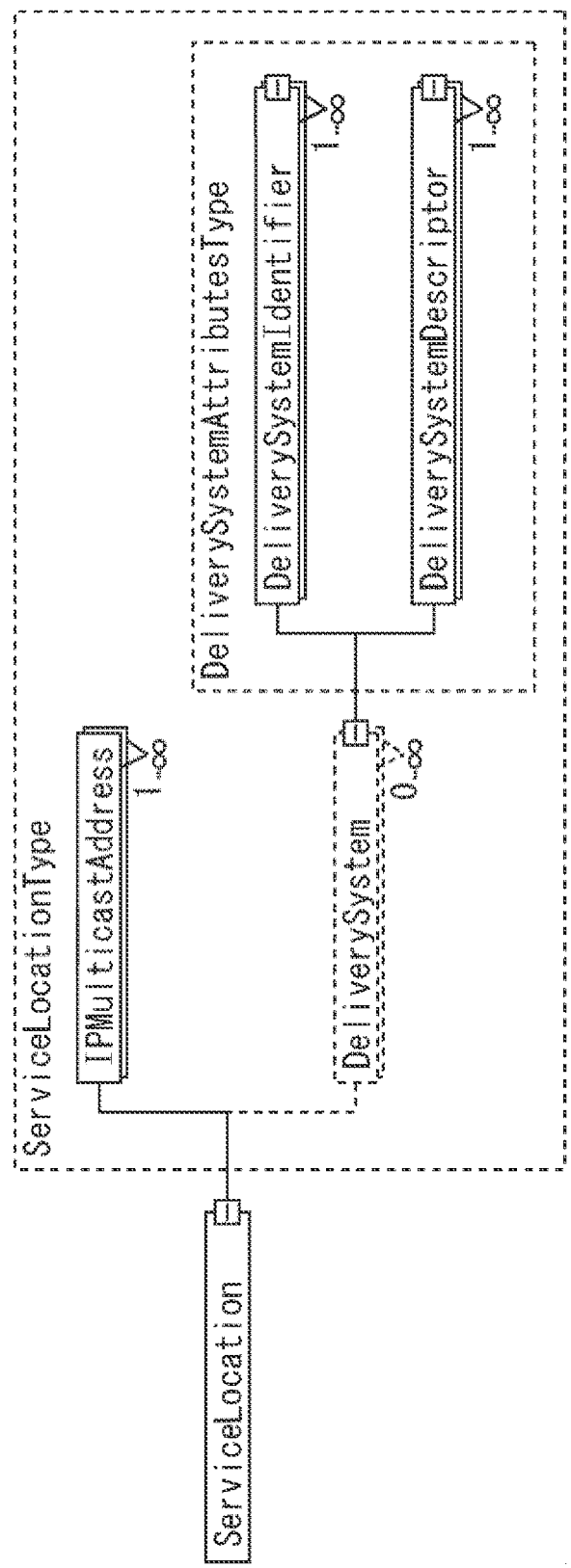
FIG. 11 is a diagram illustrating a data structure of a ServiceLocation element.

FIG. 11 illustrates the ServiceLocation element that is newly introduced into the MPD.

The ServiceLocation element includes a tuning parameter (DeliverySystemAttributes) and an IP multicast address (IPMulticastAddress). A url of the ServiceLocationAttribute file storing the ServiceLocation element as the root element is described in the ServiceLocationAttributeUrl attribute arranged in the BaseURL.

For example, when the multicast bearer or the broadcast bearer of the mobile network such as the MBMS or the like is used, a format identifier (ID_MBMS in the case of the MBMS) of the data structure of the tuning parameter employed for the multicast transmission or the broadcast transmission according to the MBMS or the like is described in a DeliverySystemIdentifier of the DeliverySystemAttributes.

Further, for example, when the broadcast bearer of the existing television broadcasting network such as the DVB terrestrial network is used, the format identifier (ID_DVB_T in the case of the DVB terrestrial network) of the data structure of the tuning parameter employed for the broadcast transmission of the DVB terrestrial network is described.

A data structure (a parameter itself) of a tuning parameter specified for the broadcast delivery or the multicast delivery identified by the DeliverySystemIdentifier is described in a DeliverySystemDescriptor of the DeliverySystemAttributes. In practice, a byte sequence indicating a parameter is converted into a character string by base64 or the like and then described in the DeliverySystemDescriptor.

FIG. 12 illustrates an example of a data structure of a user service description serving as the tuning parameter employed for the multicast transmission or the broadcast-transmission according to the MBMS.

A bundleDescription (namespace "urn:3GPP:metadata:2005:MBMS:userServiceDescription") is an element for bundling a plurality of userServiceDescriptions (namespace "urn3 GPP:metadata:2005:MBMS:userServiceDescription"). The userServiceDescription is an element storing information for acquiring (tuning/joining) a stream that is identified by a serviceId attribute and broadcast-transmitted or multicast-transmitted according to MBMS.

A deliveryMethod (namespace "urn:3GPP:metadata:2005:MBMS:userServiceDescription") is an element designating a Session Description Protocol (SDP) in which a multicast address of a stream is described. Specifically, a url of an SDP file is designated by the sessionDescriptionURl attribute. A Registration (namespace "urn:3GPP:metadata:2008:MBMS:userServiceDescription") is a process (linked to an authentication session or the like performed by activating a server side script designated by a registrationURL attribute (when a multicast stream is encrypted and protected)) for acquiring, for example, a protection key of a stream or the like necessary for registration in a multicast service.

When the UserServiceDescription structure is stored in the DeliveryServiceDescriptor as described above, if use registration is performed according to a process defined in a rule of an MBMS service, it is possible to acquire an MBMS broadcast stream or an MBMS multicast stream.

Figure 13:
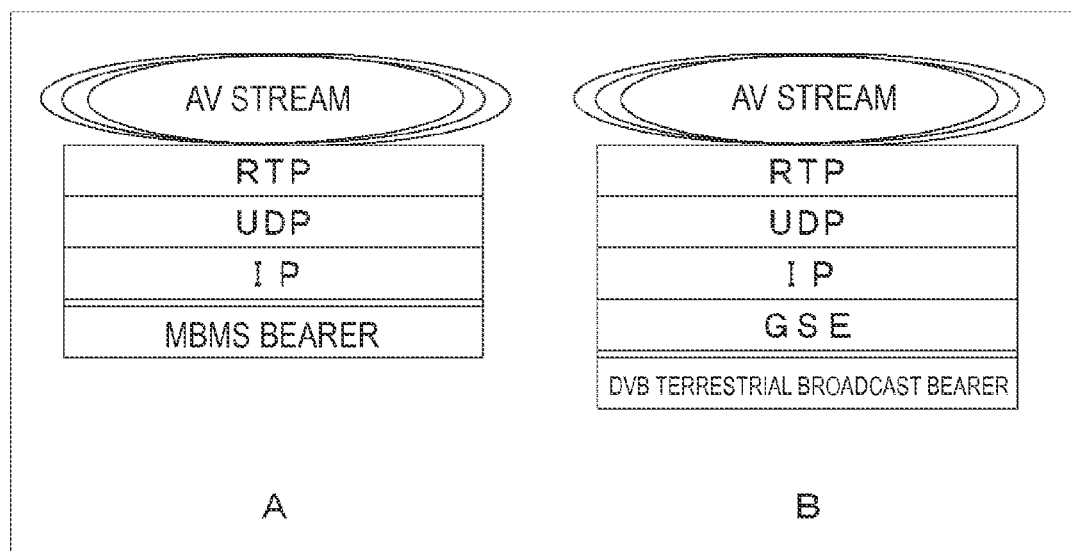
FIG. 13 is a diagram illustrating a hierarchical structure of a protocol.

A content stream is assumed to be carried, according to the RTP, on an IP packet stream having a multicast address designated by a ServiceLocation/IPMulticastAddress element among IP packet streams on the MBMS broadcast stream or the MBMS multicast stream acquired by the information stored in the ServiceLocation/DeliverySystem element as described above. A of FIG. 13 illustrates a hierarchical structure of a protocol in this case.

Further, when the broadcast bearer according to the DVB terrestrial network is used, a DVBurl format dvb:// <ONid>.<TSid>.<Sid> including a DVB_Triplet specified in "ETSI TS 102 851 V1.1.1 (2010-01) Digital Video Broadcasting (DVB); Uniform Resource Identifiers (URI) for DVB Systems" is stored as the tuning parameter, and the broadcast stream according to the DVB terrestrial network is acquired with reference to the DVBurl format.

Here, DVB_Triplet indicates information of third items of an original network identifier ONid stored in a network information table NIT of DVB-SI and a transport stream identifier TSid and a service identifier Sid stored in a stream description table SDT of DVB-SI.

A content stream is assumed to be carried, according to the RTP protocol, on an IP packet stream having a multicast address designated by the ServiceLocation/IPMulticastAddress element among IP packet streams on the broadcast stream according to the DVB terrestrial network acquired by the DVBurl format stored in the ServiceLocation/DeliverySystem element as described above. B of FIG. 13 illustrates a hierarchical structure of a protocol in this case.

[Data Structure of RTP Packet]

Here, an RTP packet when a content stream is multicast-transmitted and an RTP packet when a content stream is broadcast-transmitted will be described.

Figure 14:
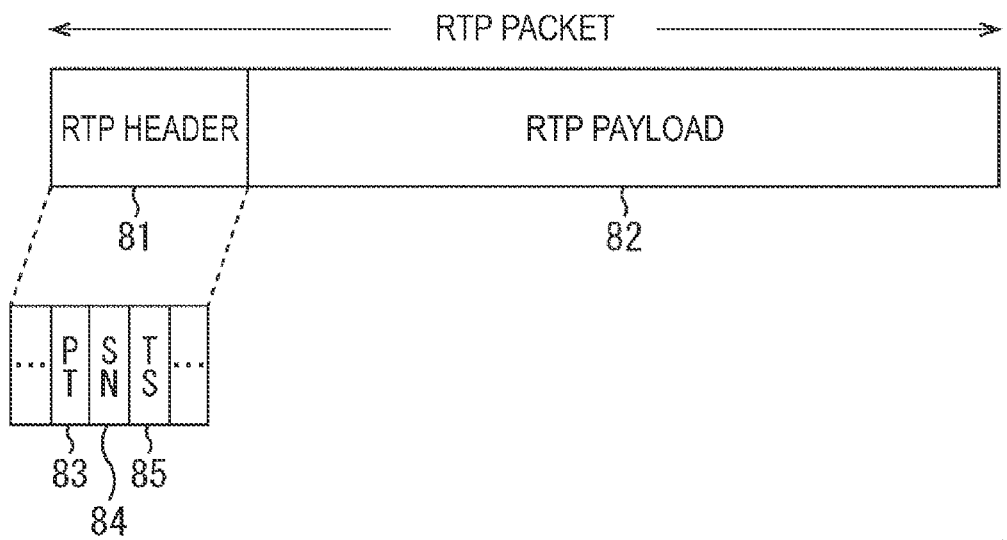
FIG. 14 is a diagram illustrating a data structure of an RTP packet.

FIG. 14 illustrates a data structure of an RTP packet. As illustrated in FIG. 14, the RTP packet includes an RTP header 81 and an RTP payload 82. The RTP header 81 includes fields of a payload header (PT) 83, a sequence number (SN) 84, and a time stamp (TS) 85.

Information indicating a type of content stored in the RTP payload 82 is described in the payload header 83. In the case of the present embodiment, information indicating a type of codec of content stored in the RTP payload 82 is described. Specifically, when an AVC fragmented MP4 is stored in the RTP payload 82, "AVC fragmented MP4 over RTP" is described, and when a HEVC fragmented MP4 is stored in the RTP payload 82, "HEVC fragmented MP4 over RTP" is described.

Sequence numbers of the RTP packet that is consecutively transmitted are described in the sequence number 84. It is detected whether or not there is a lost packet based on the sequence number.

In the time stamp 85, unlike an operation of the time stamp in the RTP packet according to the related art, a transmission time of a first bit at the time of transmission of the RTP packet and an NTP time stamp value of a 32-bit short format (specified in Clause 6 of IETF RFC5905, NTP version 4) are described. Here, in the operation of the time stamp in the RTP packet according to the related art, a time stamp of a sampling time of a first byte of payload data of the RTP payload 82 is described.

The NTP time stamp value described in the time stamp 85 is mainly used for jitter removal for transfer but not used for presentation time control as in the operation of the time stamp according to the related art. In the case of the present embodiment, a time stamp value derived from the box structure (a moof 97 of FIG. 15 or a moof 107 of FIG. 16) of the fragmented MP4 is used for the presentation time control.

[Data Structure of RTP Payload 82]

FIG. 15 illustrates a format of the RTP payload 82 when the payload header 83 indicates the "AVC fragmented MP4 over RTP," that is, when the AVC fragmented MP4 is stored in the RTP payload 82.

A of FIG. 15 illustrates a format of the RTP payload 82 of a first mode. The RTP payload 82 of the first mode includes a PayloadMode 91, a SegmentBoundary 92, a dash (ftyp) 93, a moov 94, a msix (styp) 95, a sidx 96, a moof 97, an mdat header (mdat-h) 98, and an AVC over RTP payload 99.

The PayloadMode 91 is a 1-byte value indicating a mode. In this case, a value of 1 indicating the first mode is described.

A 1-byte identifier indicating a boundary of a segment of content stored in the RTP packet is described in the SegmentBoundary 92. 1 is described when a first Network Abstraction Layer (NAL) unit of a segment of content is stored in the RTP packet, 3 is described when a last NAL unit of the segment is stored, and 2 is described in the other cases.

A ftyp (blind name: dash) box and a moov box of an Initialization Segment storing initialization information such as a decoder in the DASH are arranged in the dash (ftyp) 93 and the moov 94.

A styp (brand name: misx) box, a sidx box, and a moof box that are metadata of a Media Segment storing a chunk (fragment) of media data in the DASH and only header information including no media data of the mdat box are arranged in the msix (styp) 95, the sidx 96, the moof 97, and the mdat header 98. Information related to only one track is stored in the moof 97. The DASH client 70 calculates a CompositionTime indicating a sampling time of a first byte of Payload data as an RTP Timestamp based on the information stored in the moof 97.

A divided first NAL unit, one NAL unit, or a plurality of NAL units according to an RTP payload format standard (RTP Payload Format for H.264 Video) specified in a request for comment (rfc) 3984 are stored in the AVC over RTP payload 99.

B of FIG. 15 illustrates a format of the RTP payload 82 of a second mode. The RTP payload 82 of the second mode includes a PayloadMode 91, a SegmentBoundary 92, a msix (styp) 95, a sidx 96, a moof 97, and an AVC over RTP payload 99.

In the case of the second mode, a value of 2 indicating the second mode is described in the PayloadMode 91. A divided first NAL unit, one NAL unit, or a plurality of NAL units according to the RTP payload format standard specified in the rfc 3984 are stored in the AVC over RTP payload 99.

C of FIG. 15 illustrates a format of the RTP payload 82 of a third mode. The RTP payload 82 of the third mode includes a PayloadMode 91, a SegmentBoundary 92, and an AVC over RTP payload 99.

In the case of the third mode, a value of 3 indicating the third mode is described in the PayloadMode 91. A divided NAL unit (excluding a first NAL unit), one NAL unit, or a plurality of NAL units according to the RTP payload format standard specified in the rfc 3984 are stored in the AVC over RTP payload 99.

Next, FIG. 16 illustrates a format of the RTP payload 82 when the payload header 83 indicates the "HEVC fragmented MP4 over RTP," that is, when the HEVC fragmented MP4 is stored in the RTP payload 82.

Even when the HEVC fragmented MP4 is stored in the RTP payload 82, A to C of FIG. 16 illustrate first to third modes, similarly to the case illustrated in FIG. 15.

A of FIG. 16 illustrates a format of the RTP payload 82 of a first mode. the RTP payload 82 of the first mode includes a PayloadMode 101, a SegmentBoundary 102, a dash (ftyp) 103, a moov 104, a msix (styp) 105, a sidx 106, a moof 107, an mdat header (mdat-h) 108, and a HEVC over RTP payload 109.

The PayloadMode 101 is a 1-byte value indicating a mode. In this case, a value of 1 indicating the first mode is described.

A 1-byte identifier indicating a boundary of a segment of content stored in the RTP packet is described in the SegmentBoundary 102. 1 is described when a first NAL unit of a segment of content is stored in the RTP packet, 3 is described when a last NAL unit of the segment is stored, and 2 is described in the other cases.

A ftyp (brand name: dash) box and a moov box of an Initialization Segment storing initialization information such as a decoder in the DASH are arranged in the dash (ftyp) 103 and the moov 104.

A styp (a brand name misx) box, a sidx box, and a moof box that are metadata of a Media Segment storing a chunk (fragment) of media data in the DASH and only header information including no media data of the mdat box are arranged in the msix (styp) 105, the sidx 106, the moof 107, and the mdat header 98. Information related to only one track is stored in the moof 107. The DASH client 70 calculates a CompositionTime indicating a sampling time of a first byte of Payload data as an RTP Timestamp based on the information stored in the moof 107.

A divided first NAL unit, one NAL unit, or a plurality of NAL units according to an RTP payload format standard (RTP Payload Format for High Efficiency Video Coding) specified in a draft-schierl-payload-rtp-h265-01 are stored in the HEVC over RTP payload 108.

B of FIG. 16 illustrates a format of the RTP payload 82 of a second mode. The RTP payload 82 of the second mode includes a PayloadMode 101, a SegmentBoundary 102, a msix (styp) 105, a sidx 106, a moof 107, and a HEVC over RTP payload 109.

In the case of the second mode, a value of 2 indicating the second mode is described in the PayloadMode 101. A divided first NAL unit, one NAL unit, or a plurality of NAL units according to the RTP payload format standard specified in the draft-schierl-payload-rtp-h265-01 are stored in the HEVC over RTP payload 109.

C of FIG. 16 illustrates a format of the RTP payload 82 of a third mode. The RTP payload 82 of the third mode includes a PayloadMode 101, a SegmentBoundary 102, and a HEVC over RTP payload 109.

In the case of the third mode, a value of 3 indicating the third mode is described in the PayloadMode 101. A divided NAL unit (excluding a first NAL unit), one NAL unit, or a plurality of NAL units according to the RTP payload format standard specified in the draft-schierl-payload-rtp-h265-01 are stored in the HEVC over RTP payload 109.

[Transmission Pattern of RTP Packet]

FIG. 17 illustrates four examples of combination patterns of the formats (the first to third modes) employed in the RTP payloads 82 of the RTP packets that are consecutively transmitted.

In a first combination pattern illustrated in A of FIG. 17, the first mode is employed in the RTP payloads 82 of all the RTP packets that are consecutively transmitted. In the case of the first combination pattern, first to third RTP packets correspond to one segment, and fourth and fifth RTP packets correspond to one segment.

In a second combination pattern illustrated in B of FIG. 17, the first mode, the second mode, the second mode, the first mode, and the second mode are employed in order in the RTP payload 82 of first to fifth RTP packets that are consecutively transmitted. In the case of the second combination pattern, the first to third RTP packets correspond to one segment, and the fourth and fifth RTP packets correspond to one segment.

In a third combination pattern illustrated in C of FIG. 17, the first mode, the second mode, the third mode, the first mode, and the third mode are employed in order in the RTP payload 82 of first to fifth RTP packets that are consecutively transmitted. In the case of the third combination pattern, the first to third RTP packets correspond to one segment, and the fourth and fifth RTP packets correspond to one segment.

In a fourth combination pattern illustrated in D of FIG. 17, the first mode, the third mode, the third mode, the third mode, and the third mode are employed in order in the RTP payload 82 of first to fifth RTP packets that are consecutively transmitted. In the case of the fourth combination pattern, the first to fifth RTP packets correspond to one segment.

The combination pattern is arbitrary and not limited to the illustrated examples, but it is necessary to employ the first mode in one or more RTP payloads 82 among one or more RTP packets stored in one segment.

[Operation of Content Supply System 50]

Next, an operation of the content supply system 50 will be described.

Figure 18:
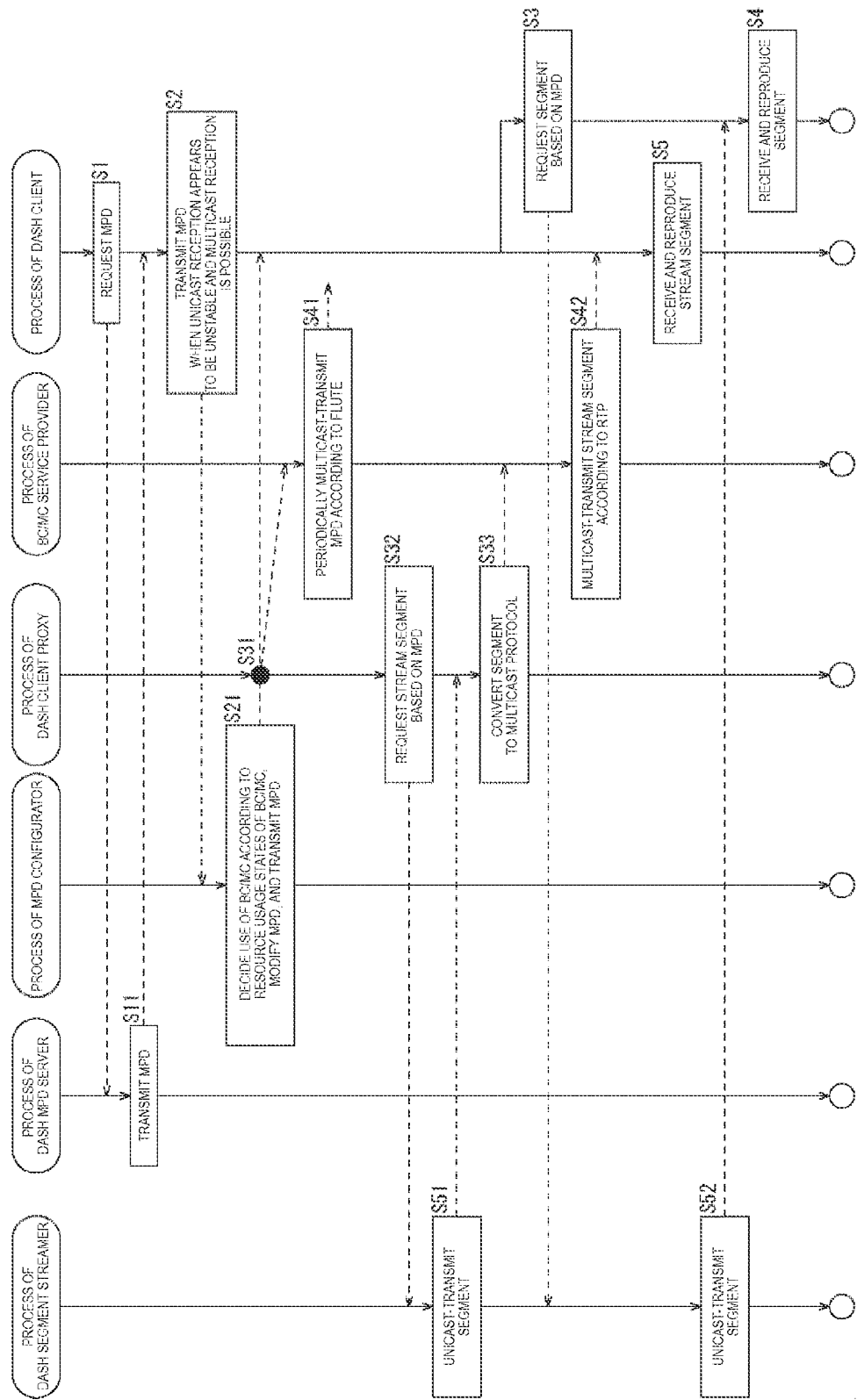
FIG. 18 is a flowchart for describing a first operation of a content supply system.

FIG. 18 is a flowchart for describing a first operation of the content supply system 50. In the first operation, the DASH client 70 voluntarily requests the MPD configurator 65 to modify the MPD.

As the premise of the first operation, the DASH segment streamer 62 is assumed to acquire a plurality of pieces of streaming data of content of the same subject having different bit rates from the content management server 61, divide each streaming data into segments, hold the segments, and start the unicast delivery of the segment according to the HTTP.

Further, the DASH MPD server 63 is assumed to generate the MPD based on the address of the file of the stream segment reported by the DASH segment streamer 62 and start the unicast delivery of the MPD according to the HTTP.

In step S1, the DASH client 70 that desires to receive and reproduce content accesses the DASH MPD server 63 via the Internet 11, and requests the DASH MPD server 63 to transmit the MPD. The DASH client 70 is assumed to hold the address of the DASH MPD server 63 in advance.

In step S11, the DASH MPD server 63 unicast-transmits the MPD to the DASH client 70 via the Internet 11 according to the HTTP in response to the request from the DASH client 70.

The DASH client 70 that has received the MPD accesses the DASH segment streamer 62 based on the MPD, and receives and reproduces the stream segment unicast-delivered according to the HTTP.

Specifically, the HTTP request is issued based on the BaseURL and the mediaRange of the MPD to request the DASH segment streamer 62 to transmit the file of the DASH stream segment. In response to this request, the DASH segment streamer 62 unicast-transmits the corresponding file to the DASH client 70 via the Internet 11 according to the HTTP, and the DASH client 70 receives and reproduces the corresponding file.

During this reception, in step S2, the DASH client 70 monitors a communication band of the Internet 11, and when unicast reception via the Internet 11 appears to be unstable, and the DASH client 70 can receive multicast transmission or broadcast transmission of content via the broadcasting network 12, the DASH client 70 transmits the acquired MPD to the MPD configurator 65, and requests the MPD configurator 65 to modify the MPD.

In step S21, in response to the MPD modification request from the DASH client 70, the MPD configurator 65 checks resource usage states of the broadcast bearer and the multicast bearer through the broadcast/multicast resource manager 66. Further, the MPD configurator 65 decides whether or not both the broadcast bearer and the multicast bearer are to be used in view of the cost, and requests the broadcast/multicast resource manager 66 to secure corresponding resources. After receiving a notification indicating that the resources can be secured from the broadcast/multicast resource manager 66, the MPD configurator 65 modifies the MPD, and transmits the modified MPD to the DASH client 70. The transmitted modified MPD is monitored by the DASH client proxy 67 before being received by the DASH client 70.

In step S31, the DASH client proxy 67 that has monitored the modified MPD requests the broadcast/multicast provider 68 to periodically multicast-transmit the MPD according to the FLUTE of the broadcasting network 12. In step S41, the broadcast/multicast provider 68 periodically multicast-transmits the modified MPD according to the FLUTE of the broadcasting network 12 in response to this request. Through the multicast transmission, the modified MPD can be supplied to even the DASH client 70 that has not transmitted the request to modify the MPD.

In step S32, the DASH client proxy 67 requests the DASH segment streamer 62 instead of the DASH client 70 to transmit the stream segment based on the monitored MPD. In step S51, the DASH segment streamer 62 unicast-delivers the stream segment to the DASH client proxy 67 according to the HTTP via the Internet 11 in response to this request.

In step S33, the DASH client proxy 67 that has received the stream segment unicast-delivered according to the HTTP from the DASH segment streamer 62 performs a protocol conversion of transferring the stream segment stored in the HTTP packet to the RTP payload 82 of the RTP packet without change and without excluding the box structure. The protocol conversion is performed as described above with reference to FIG. 15 or FIG. 16.

Further, the DASH client proxy 67 requests the broadcast/multicast provider 68 to multicast-transmit and broadcast-transmit the stream segment that has undergone the protocol conversion according to the RTP via the broadcasting network 12.

In step S42, the broadcast/multicast provider 68 starts to multicast-transmit and broadcast-transmit the stream segment whose protocol has been converted according to the RTP via the broadcasting network 12 in response to this request.

Thereafter, the DASH client 70 that has acquired the modified MPD proceeds to step S3 or step S5.

In other words, when the stream segment unicast-delivered according to the HTTP via the Internet 11 is continuously received and reproduced, the process proceeds to step S3. Further, when switching to the stream segment multicast-transmitted or broadcast-transmitted according to the RTP via the broadcasting network 12 is performed, the process proceeds to step S5.

In step S3, when the unicast-delivered stream segment is continuously received and reproduced, the DASH client 70 requests the DASH segment streamer 62 to transmit the stream segment based on the MPD. Then, in step S4, the stream segment unicast-delivered from the DASH segment streamer 62 according to the HTTP via the Internet 11 in response to the request (process of step S52) is received and reproduced.

In step S5, when switching to the stream segment multicast-transmitted or broadcast-transmitted according to the RTP via the broadcasting network 12 is performed, the DASH client 70 performs reception and reproduction by switching from the segment stream unicast-transmitted according to the HTTP to the protocol-converted stream segment multicast-transmitted or broadcast-transmitted according to the RTP based on the modified MPD.

A timing of the switching is decided based on a correspondence relation with a segment sequence corresponding to a representation carried in the unicast manner depending on time interval information of the rtspRange stored in the segment sequence corresponding to the representation corresponding to the multicast stream on the modified MPD.

The time stamp value derived from the moof 97 (or the moof 107) of the RTP payload 82 is used for the presentation time control in the DASH client 70.

Thereafter, seamless switching can be performed between the stream segment unicast-transmitted according to the HTTP via the Internet 11 and the stream segment multicast-transmitted or broadcast-transmitted according to the RTP via the broadcasting network 12.

The description of the first operation of the content supply system 50 is now finished.

Figure 19:
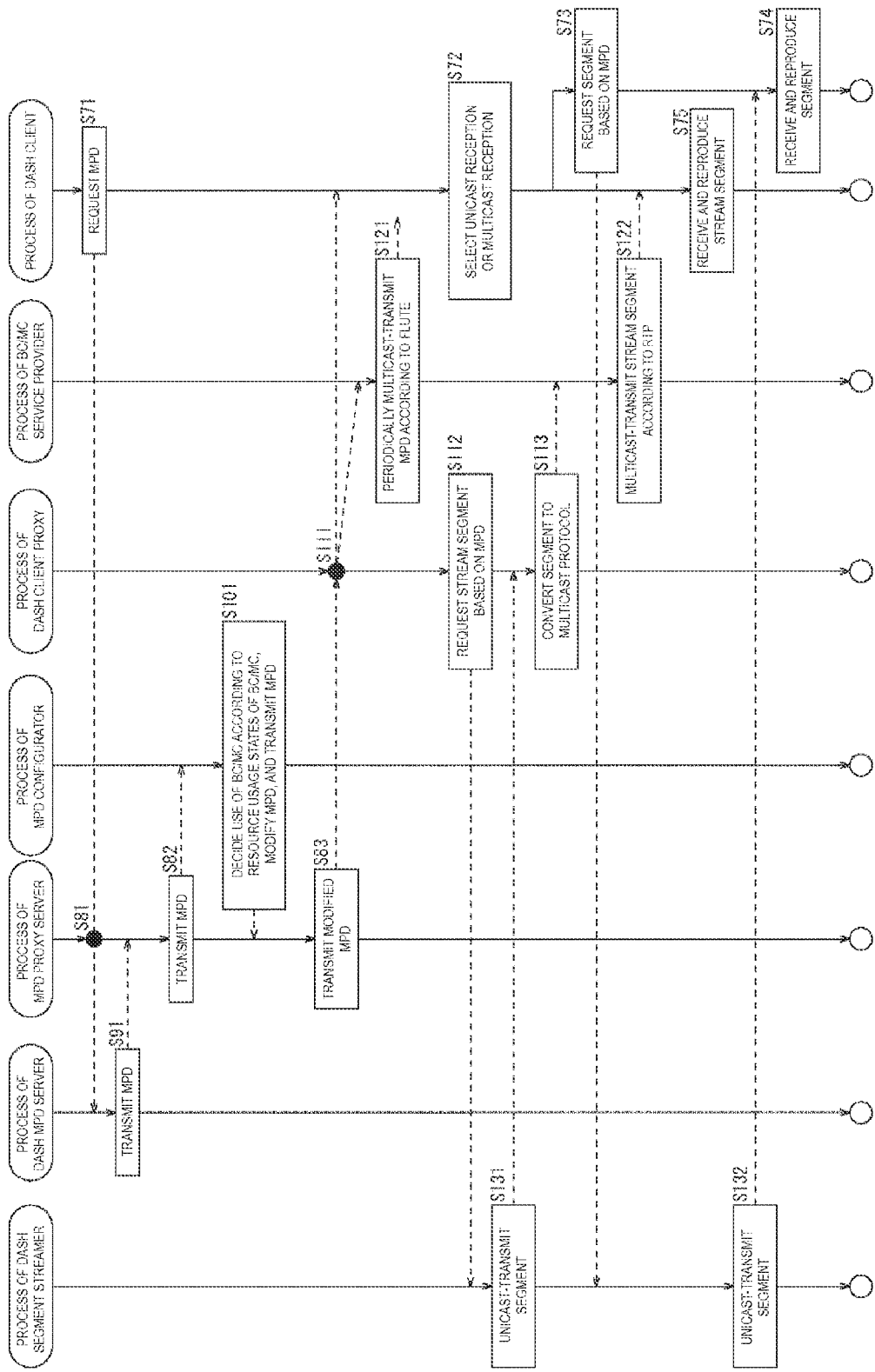
FIG. 19 is a flowchart for describing a second operation of a content supply system.
Figure 20:
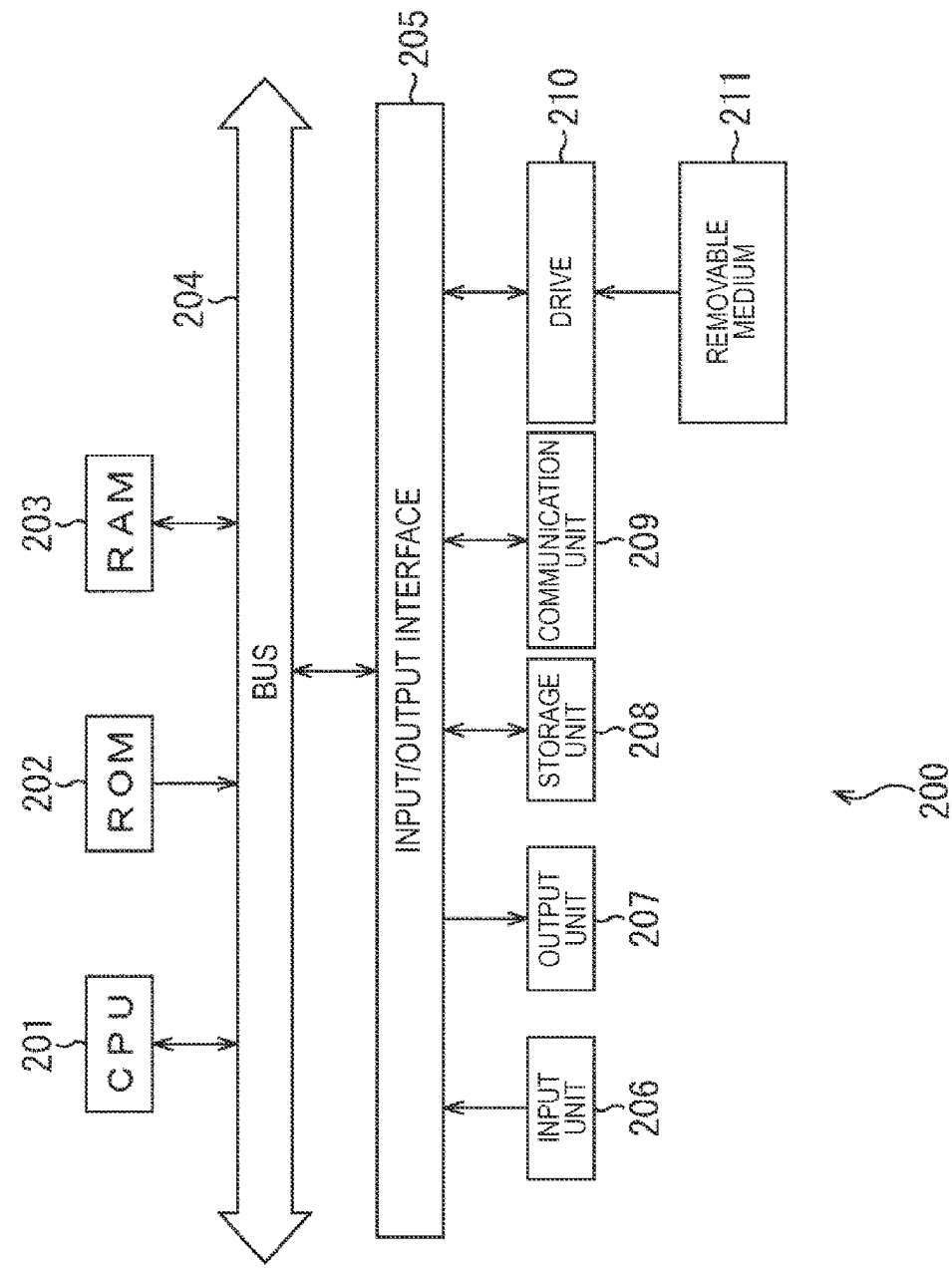
FIG. 20 is a block diagram illustrating an exemplary configuration of a computer.

Next, FIG. 19 is a flowchart for describing a second operation of the content supply system 50. In the second operation, the MPD proxy server 64 requests the MPD configurator 65 to modify the MPD as a main agent.

As the premise of the second operation, the DASH segment streamer 62 is assumed to acquire a plurality of pieces of streaming data of content of the same subject having different bit rates from the content management server 61, divide each streaming data into segments, hold the segments, and start the unicast transmission of the segment according to the HTTP.

Further, the DASH MPD server 63 is assumed to generate the MPD based on the address of the file of the stream segment reported by the DASH segment streamer 62 and start the unicast delivery of the MPD according to the HTTP.

In step S71, the DASH client 70 that desires to receive and reproduce content accesses the DASH MPD server 63 via the Internet 11, and requests the DASH MPD server 63 to transmit the MPD. This request is received by the MPD proxy server 64 and in step S81, the MPD proxy server 64 requests the DASH MPD server 63 to transmit the MPD.

In step S91, the DASH MPD server 63 unicast-transmits the MPD to the MPD proxy server 64 according to the HTTP in response to the request from the MPD proxy server 64. In step S82, the MPD proxy server 64 that has received the MPD transmits the received MPD to the MPD configurator 65, and requests the MPD configurator 65 to modify the MPD.

In step S101, in response to the MPD modification request, the MPD configurator 65 checks resource usage states of the broadcast bearer and the multicast bearer through the broadcast/multicast resource manager 66. Further, the MPD configurator 65 decides whether or not both the broadcast bearer and the multicast bearer are to be used in view of the cost, and requests the broadcast/multicast resource manager 66 to secure corresponding resources. After receiving a notification indicating that the resources can be secured from the broadcast/multicast resource manager 66, the MPD configurator 65 modifies the MPD, and transmits the modified MPD to the MPD proxy server 64.

In step S83, the MPD proxy server 64 transmits the modified MPD to the DASH client 70. The transmitted modified MPD is monitored by the DASH client proxy 67 before received by the DASH client 70.

In step S111, the DASH client proxy 67 that has monitored the modified MPD requests the broadcast/multicast provider 68 to periodically multicast-transmit the MPD according to the FLUTE of the broadcasting network 12. In step S121, the broadcast/multicast provider 68 periodically multicast-transmits the modified MPD according to the FLUTE of the broadcasting network 12 in response to this request. Through the multicast transmission, the modified MPD can be supplied to even the DASH client 70 that has not transmitted the request to modify the MPD.

In step S112, the DASH client proxy 67 requests the DASH segment streamer 62 instead of the DASH client 70 to transmit the stream segment based on the monitored modified MPD. In step S131, the DASH segment streamer 62 unicast-transmits the stream segment to the DASH client proxy 67 according to the HTTP via the Internet 11 in response to this request.

In step S113, the DASH client proxy 67 that has received the stream segment unicast-transmitted according to the HTTP from the DASH segment streamer 62 performs a protocol conversion of transferring the stream segment stored in the HTTP packet to the RTP payload 82 of the RTP packet without change and without excluding the box structure. The protocol conversion is performed as described above with reference to FIG. 15 or FIG. 16.

Further, the DASH client proxy 67 requests the broadcast/multicast provider 68 to multicast-transmit and broadcast-transmit the stream segment that has undergone the protocol conversion according to the RTP via the broadcasting network 12.

In step S122, the broadcast/multicast provider 68 starts to multicast-transmit and broadcast-transmit the stream segment whose protocol has been converted according to the RTP via the broadcasting network 12 in response to this request.

Meanwhile, the DASH client 70 holds the modified MPD acquired previously. In step S72, the DASH client 70 selects whether the unicast transmission via the Internet 11 is to be received or the multicast transmission or the broadcast transmission via the broadcasting network 12 is to be received based on the communication band state of the Internet 11, the reception function and the decoding function of the DASH client 70, or the like.

When the reception and reproduction of the stream segment unicast-delivered according to the HTTP via the Internet 11 are selected, the process proceeds to step S73. In step S73, the DASH client 70 requests the DASH segment streamer 62 to transmit the stream segment based on the MPD. Then, in step S74, the stream segment unicast-transmitted from the DASH segment streamer 62 according to the HTTP via the Internet 11 in response to the request (process of step S132) is received and reproduced.

Further, when the reception and reception of the stream segment multicast-transmitted or broadcast-transmitted according to the RTP via the broadcasting network 12 are selected in step S72, the process proceeds to step S75. In step S75, the DASH client 70 receives and reproduces the protocol-converted stream segment multicast-transmitted or broadcast-transmitted according to the RTP based on the modified MPD.

The time stamp value derived from the moof 97 (or the moof 107) of the RTP payload 82 is used for the presentation time control in the DASH client 70.

Thereafter, seamless switching can be performed between the stream segment unicast-transmitted according to the HTTP via the Internet 11 and the stream segment multicast-transmitted or broadcast-transmitted according to the RTP via the broadcasting network 12.

The description of the second operation of the content supply system 50 is now finished.

As described above, the content supply system 50 according to the present embodiment can perform seamless switching between the stream segment unicast-transmitted according to the HTTP via the Internet 11 and the stream segment multicast-transmitted or broadcast-transmitted according to the RTP via the broadcasting network 12. Thus, the user of the DASH client 70 can adaptively select and view streams of content of the same subject having different paths.

Further, the content supply system 50 according to the present embodiment can store the stream segment unicast-transmitted according to the HTTP in the RTP packet without change and without destroying the box structure and multicast-transmit or broadcast-transmit the resultant RTP packet. Thus, the content supply side can easily prepare an alternative path in the DASH.

By the way, each of the content supply device 60 and the DASH client 70 that execute a series of processes described above can be configured with hardware or can be implemented by executing software through a computer. Examples of the computer include a computer embedded in dedicated hardware and a general-purpose personal computer capable of installing various kinds of programs and executing various kinds of functions.

FIG. 206 is a block diagram illustrating an exemplary hardware configuration of the computer.

In a computer 200, a central processing unit (CPU) 201, a read only memory (ROM) 202, and a random access memory (RAM) 203 are connected with one another via a bus 204.

An input/output interface 205 is connected to the bus 204. An input unit 206, an output unit 207, a storage unit 208, a communication unit 209, and a drive 220 are connected to the input/output interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface. The drive 220 drives a removable medium 211 such as a magnetic disk, an optical disk, a magneto-optical disk, or a semiconductor memory.

In the computer 200 having the above-described configuration, for example, a series of processes described above are performed by loading a program stored in the storage unit 208 onto the RAM 203 through the input/output interface 205 and the bus 204 and executing the loaded program through the CPU 201.

For example, the program executed by the computer 200 (the CPU 201) may be recorded in the removable medium 211 serving as a package medium or the like and provided. The program may be provided via a wired or wireless transmission medium such as a local area network, the Internet, or digital satellite broadcasting.

In the computer 200, the removable medium 211 may be mounted on the drive 220, and the program may be installed in the storage unit 208 through the input/output interface 205. The program may be received by the communication unit 209 via a wired or wireless transmission medium and installed in the storage unit 208. Moreover, the program may be installed in the ROM 202 or the storage unit 208 in advance.

Further, the program executed by the computer 200 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)
A content supply device that supplies streaming data of content according to MPEG-DASH, the content supply device including:
a HTTP transmitting unit configured to convert the streaming data into files in units of segments and unicast-transmit the resulting segment files according to HTTP;
an RTP transmitting unit configured to store the segment file in an RTP packet without change and transmit the RTP packet through at least one of multicasting and broadcasting according to RTP; and
a metafile generating unit configured to generate a metafile in which a temporal correspondence relation between the segment file unicast-transmitted according to the HTTP and the segment file transmitted through the at least one of the multicasting and the broadcasting according to the RTP is described and supply the metafile to a reception side.

(2)
The content supply device according to (1),
wherein the streaming data of the content is a fragmented MP4, and
wherein the RTP transmitting unit stores the segment file in the RTP packet while maintaining a box structure of the fragmented MP4, and transmits the RTP packet through the at least one of the multicasting and the broadcasting according to the RTP.

(3)
The content supply device according to (1) or (2),
wherein the RTP transmitting unit describes a transmission time of a first bit at a time of transmission of the RTP packet in a time stamp field of an RTP header of the RTP packet.

(4)
The content supply device according to any of (1) to (2),
wherein the RTP transmitting unit describes information indicating a mode of an RTP payload and information indicating a segment boundary in the RTP payload of the RTP packet, and arranges an NAL unit in payload data.

(5)
The content supply device according to (4),
wherein the RTP transmitting unit arranges both metadata of an Initialization Segment and metadata of a Media Segment specified in the MPEG-DASH in an RTP payload of the RTP packet, arranges the metadata of the Media Segment in the RTP payload of the RTP packet, or arranges neither of the metadata of the Initialization Segment and the metadata of the Media Segment in the RTP payload of the RTP packet.

REFERENCE SIGNS LIST

11 Internet
12 broadcasting network
50 content supply system
60 content supply device
61 content management server
62 DASH segment streamer
63 DASH MPD server
64 MPD proxy server
65 MPD configurator
66 broadcast/multicast resource manager
67 DASH client proxy
68 broadcast/multicast service provider
70 DASH client
200 computer

201 CPU

The invention claimed is:

1. A content supply device configured to supply streaming data of content according to moving picture experts group-dynamic adaptive streaming over hypertext transfer protocol (MPEG-DASH), the content supply device comprising:
processing circuitry configured to:
convert the streaming data, whose data format is a fragmented moving picture experts group audio layer 4 (MP4), into files in units of segments to obtain a plurality of segment files and unicast-transmit the segment files according to hypertext transfer protocol (HTTP);
store a segment file of the plurality of segment files in a realtime transport protocol (RTP) packet, wherein the segment file stored in the RTP packet is same as the segment file unicast-transmitted and wherein destroying a box structure of the fragmented MP4 is avoided and transmit the RTP packet through at least one of multicast and broadcast according to RTP;
extend a metafile in the MPEG-DASH to describe, in the extended metafile, a correspondence relation between the segment file unicast-transmitted according to the HTTP and the segment file transmitted through the at least one of the multicast and the broadcast according to the RTP; and
supply the metafile to a reception side.

2. The content supply device according to claim 1, wherein the processing circuitry is further configured to describe a transmission time of a first bit at a time of transmission of the RTP packet in a time stamp field of an RTP header of the RTP packet.

3. The content supply device according to claim 2, wherein the processing circuitry is further configured to describe information indicating a mode of an RTP payload and information indicating a segment boundary in the RTP payload of the RTP packet, and arrange a network abstraction layer (NAL) unit in payload data.

4. The content supply device according to claim 2, wherein the processing circuitry is further configured to
arrange both metadata of an Initialization Segment and metadata of a Media Segment specified in the MPEG-DASH in an RTP payload of the RTP packet,
arrange the metadata of the media segment in the RTP payload of the RTP packet, or
arrange neither of the metadata of the Initialization Segment and the metadata of the media segment in the RTP payload of the RTP packet.

5. A content supply method of a content supply device configured to supply streaming data of content according to moving picture experts group-dynamic adaptive streaming over http (MPEG-DASH), the content supply method comprising:
converting the streaming data, whose data format is a fragmented moving picture experts group audio layer 4 (MP4), into files in units of segments to obtain a plurality of segment files and unicast-transmitting the segment files according to hypertext transfer protocol (HTTP) through the content supply device;
storing a segment file of the plurality of segment files in a real-time transport protocol (RTP) packet, wherein the segment file that are stored in the RTP packet is same as the segment file unicast-transmitted and wherein destroying a box structure of the fragmented MP4 is avoided and transmitting the RTP packet through at least one of multicasting and broadcasting according to RTP through the content supply device;
extending, using processing circuitry, a metafile in the MPEG-DASH to describe, in the extended metafile, a correspondence relation between the segment file unicast-transmitted according to the HTTP and the segment file transmitted through the at least one of the multicast and the broadcast according to the RTP; and
supplying the metafile to a reception side through the content supply device.

6. A non-transitory computer-readable storage medium having stored thereon computer-executable instructions for causing a computer that supplies streaming data of content according to moving picture experts group-dynamic adaptive streaming over http (MPEG-DASH) to execute operations, comprising:
converting the streaming data into files in units of segments to obtain a plurality of segment files and unicast-transmitting the segment files according to hypertext transfer protocol (HTTP);
storing a segment file of the plurality of segment files, whose data format is a fragmented moving picture experts group audio layer 4 (MP4), in a real-time transport protocol (RTP) packet, wherein the segment file stored in the RTP packet is same as the segment file unicast-transmitted and wherein destroying a box structure of the fragmented MP4 is avoided and transmitting the RTP packet through at least one of multicasting and broadcasting according to RTP;
extending a metafile in the MPEG-DASH to describe, in the extended metafile, a correspondence relation between the segment file unicast-transmitted according to the HTTP and the segment file transmitted through the at least one of the multicast and the broadcast according to the RTP; and
supplying the metafile to a reception side.

7. A content supply system, comprising:
a content supply device configured to supply streaming data of content according to moving picture experts group-dynamic adaptive streaming over http (MPEG-DASH); and
a client device configured to receive the stream data,
wherein the content supply device includes
processing circuitry configured to:
convert the streaming data, whose data format is a fragmented moving picture experts group audio layer 4 (MP4), into files in units of segments to obtain a plurality of segment files and unicast-transmit the segment files according to hypertext transfer protocol (HTTP),
store a segment file of the plurality of segment files in a real-time transport protocol (RTP) packet, wherein the segment file stored in the RTP packet is same as the segment file unicast-transmitted and wherein destroying a box structure of the fragmented MP4 is avoided and transmit the RTP packet through at least one of multicast and broadcast according to RTP,
extend a metafile in the MPEG-DASH to describe, in the extended metafile, a correspondence relation between the segment file unicast-transmitted according to the HTTP and the segment file transmitted through the at least one of the multicast and the broadcast according to the RTP, and
supply the metafile to a reception side, and
wherein the client device is configured to switch between the segment file unicast-transmitted according to the HTTP and the segment file transmitted through the at least one of the multicasting and the broadcasting according to the RTP based on the acquired metafile, and receive and reproduce the segment file.

8. The content supply device according to claim 1, wherein the correspondence relation between the segment file unicast-transmitted and the segment file transmitted through the at least one of the multicast and the broadcast according to the RTP is a temporal relation.

9. The content supply device according to claim 8, wherein the temporal relation is the correspondence relation that indicates an interval of the segment file unicast-transmitted and an interval of the segment file transmitted through the at least one of the multicast and the broadcast according to the RTP.

10. A method performed by a client device receiving content as streaming data, the method comprising:
requesting, using processing circuitry, a media presentation description (MPD); receiving the MPD transmitted by unicast;
receiving segment files of the streaming data by unicast according to hypertext transfer protocol (HTTP) and according to the received MPD, wherein a data format of the streaming data is a fragmented moving picture experts group audio layer 4 (MP4), transmitting the received MPD to obtain a modified MPD; and
receiving the segment files from broadcast or multicast according to a realtime
transport protocol (RTP) and according to the modified MPD, wherein
the segment files maintains and avoids destroying a box structure of the fragmented MP4, and
the modified (MPD) describes a correspondence relation between the segment file unicasted according to the HTTP and the segment file transmitted through the at least one of the multicasting and the broadcasting according to the RTP.

11. The method of claim 10, wherein the correspondence relation between the segment file unicasted and the segment file transmitted through the at least one of the multicast and the broadcast according to the RIP is a temporal relation.

12. The method of claim 11, wherein the temporal relation is the correspondence relation that indicates an interval of the segment file unicasted and an interval of the segment file transmitted through the at least one of the multicast and the broadcast according to the RTP.

13. A receiving device receiving content as streaming data, the receiving device comprising:
processing circuitry configured to
request a media presentation description (MPD); receive the MPD transmitted by unicast;
receive segment files of the streaming data by unicast according to hypertext transfer protocol (HTTP) and according to the received MPD, wherein a data format of the streaming data is a fragmented moving picture experts group audio layer 4 (MP4), transmit the received MPD to obtain a modified MPD; and
receive the segment files from broadcast or multicast according to RTP and according to the modified MPD, wherein
the segment files maintains and avoids destroying a box structure of the fragmented MP4, and the modified Midi) describes a correspondence relation between the segment file unicasted according to the HTTP and the segment file transmitted through the at least one of the multicasting and the broadcasting according to the RTP.

14. The receiving device of claim 13, wherein the correspondence relation between the segment file unicasted and the segment file transmitted through the at least one of the multicast and the broadcast according to the RIP is a temporal relation.

15. The receiving device of claim 14, wherein the temporal relation is the correspondence relation that indicates an interval of the segment file unicasted and an interval of the segment file transmitted through the at least one of the multicast and the broadcast according to the RTP.

16. A non-transitory computer-readable medium having stored thereon computer-readable instructions which when executed by a computer cause the computer to perform a method comprising:
requesting a media presentation description (MPD), receiving the MPD transmitted by unicast;
receiving segment files of the streaming data by unicast according to hypertext transfer protocol (HTTP) and according to the received MPD, wherein a data format of the streaming data is a fragmented moving picture experts group audio layer 4 (MP4), transmitting the received MPD to obtain a modified MPD; and
receiving the segment files from broadcast or multicast according to a realtime
transport protocol (RTP) and according to the modified MPD, wherein
the segment files maintains and avoids destroying a box structure of the fragmented MP4, and
the modified (MPD) describes a correspondence relation between the segment file unicasted according to the HTTP and the segment file transmitted through the at least one of the multicasting and the broadcasting according to the RTP.

17. The non-transitory computer-readable medium of claim 16, wherein the correspondence relation between the segment file unicasted and the segment file transmitted through the at least one of the multicast and the broadcast according to the RTP is a temporal relation.

18. The non-transitory computer-readable medium of claim 17, wherein the temporal relation is the correspondence relation that indicates an interval of the segment file unicasted and an interval of the segment file transmitted through the at least one of the multicast and the broadcast according to the RTP.

19. A non-transitory computer readable medium tangibly embodying data comprising a media presentation description (MPD), a modified MPD, segment files of streaming data by unicast according to hypertext transfer protocol (HTTP) and from broadcast or multicast according to a realtime transport protocol (RTP),
wherein the segment files maintains and avoids destroying a box structure of a fragmented MP4, wherein the modified MPD describes a correspondence relation between the segment file unicasted according to the HTTP and the segment file transmitted through the at least one of the multicasting and the broadcasting according to the RTP.

* * * * *